US011755533B2

(12) United States Patent
Rautray et al.

(10) Patent No.: US 11,755,533 B2
(45) Date of Patent: Sep. 12, 2023

(54) AUTOMATICALLY ASSIGNING APPLICATION SHORTCUTS TO FOLDERS WITH USER-DEFINED NAMES

(71) Applicant: Rovi Guides, Inc., San Jose, CA (US)

(72) Inventors: Aditya Rautray, Bangalore (IN); Deviprasad Punja, Bangalore (IN); Madhusudhan Srinivasan, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/255,003

(22) PCT Filed: Mar. 14, 2019

(86) PCT No.: PCT/US2019/022250
§ 371 (c)(1),
(2) Date: Dec. 22, 2020

(87) PCT Pub. No.: WO2020/185235
PCT Pub. Date: Sep. 17, 2020

(65) Prior Publication Data
US 2022/0050810 A1 Feb. 17, 2022

(51) Int. Cl.
*G06F 16/16* (2019.01)
*G06F 16/14* (2019.01)

(52) U.S. Cl.
CPC .......... *G06F 16/166* (2019.01); *G06F 16/148* (2019.01); *G06F 16/156* (2019.01); *G06F 16/168* (2019.01)

(58) Field of Classification Search
CPC .... G06F 16/148; G06F 16/156; G06F 16/166; G06F 16/168
See application file for complete search history.

(56) References Cited

U.S. PATENT DOCUMENTS

| 8,972,878 | B2* | 3/2015 | Mohler | H04L 67/54 715/708 |
| 10,440,169 | B1* | 10/2019 | Gordon | G06F 3/04886 |
| 11,099,863 | B2* | 8/2021 | Klein | G09G 5/14 |
| 11,455,085 | B2* | 9/2022 | Tyler | G06F 3/0483 |

(Continued)

FOREIGN PATENT DOCUMENTS

EP 2447861 A1 5/2015

OTHER PUBLICATIONS

International Search Report & Written Opinion for International Application No. PCT/US2019/022250 dated Nov. 27, 2019.

*Primary Examiner* — Angelica Ruiz
(74) *Attorney, Agent, or Firm* — Haley Guiliano LLP

(57) ABSTRACT

Systems and methods are described for automatically organizing application shortcuts into folders with user-defined names. An illustrative method includes identifying a plurality of keywords associated with folders with user-defined names on a device, identifying a keyword associated with an application being installed on the device, determining whether the keyword associated with the application matches a keyword in the plurality of keywords, and in response to determining that the keyword associated with the application matches a keyword in the plurality of keywords, adding a shortcut for the application to a folder with a user-defined name corresponding to the matching keyword.

20 Claims, 15 Drawing Sheets

(56) References Cited

U.S. PATENT DOCUMENTS

2012/0210219 A1\* 8/2012 Agnoli ................ G06F 16/7867
                                                      715/716
2013/0166527 A1   6/2013 Kasterstein et al.
2015/0106737 A1   4/2015 Montoy-Wilson et al.
2018/0046695 A1\* 2/2018 Wexler .................... G06F 16/51

\* cited by examiner

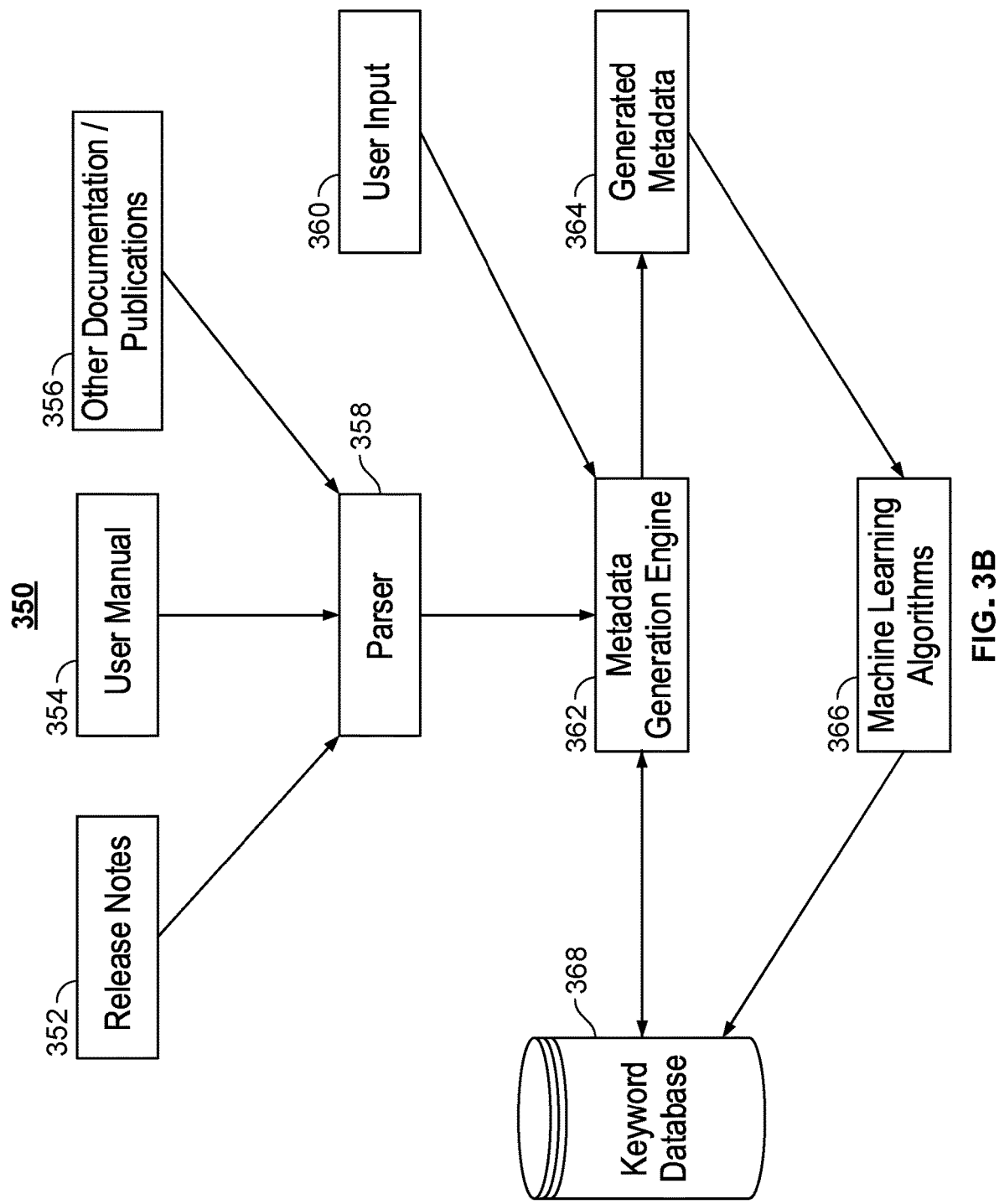

800

802
Begin Subroutine for Identifying an Application Category Associated with an Application Corresponding to a Shortcut in a Given Folder with a User-defined Name 804
Retrieve Metadata Associated with the Application Corresponding to the Shortcut 806
Retrieve, from the Metadata, an Application Category Associated with the Application Corresponding to the Shortcut

FIG. 8

AUTOMATICALLY ASSIGNING APPLICATION SHORTCUTS TO FOLDERS WITH USER-DEFINED NAMES

CROSS-REFERENCE TO RELATED APPLICATION

This application is a U.S. National Phase Application filed under 35 U.S.C. § 371 of International Patent Application No. PCT/US2019/022250, filed on Mar. 14, 2019 which is hereby incorporated by reference in its entirety.

BACKGROUND

The present disclosure relates to arranging application shortcuts on devices, and more particularly, to methods and systems for automatically assigning application shortcuts to folders with user-defined names.

SUMMARY

Media devices may be configured to install various applications and to display shortcuts for the applications on a graphical user interface (GUI). To avoid cluttering the GUI of their media devices and to organize their shortcuts, users often create various folders to which they assign the shortcuts. A user may assign custom names to these folders and may sort together shortcuts for applications in a way that is unique to that user. For example, one user may sort shortcuts for transportation-related applications together with shortcuts for travel-related applications, while another user may sort shortcuts for transportation-related applications together with work-related applications, and yet another user may sort shortcuts for transportation-related applications in a separate folder on their own.

Media devices may automatically assign shortcuts for newly installed applications to existing folders having names matching the classifications of the newly installed applications. For example, if a media device has a folder named "News," the media device will assign shortcuts for newly installed applications that are classified as news applications to the folder named "News." When a user has assigned custom names to folders on their media devices or has assigned shortcuts for applications of different types or classifications to the same folders with user-defined names, the media devices cannot match newly installed applications to the folders with user-defined names. For example, if a user assigned shortcuts for a video streaming-type application and a gaming-type application to a folder the user has custom named "Sooo bored . . . ," a media device cannot assign shortcuts for any newly installed applications to that folder because "Sooo bored . . . " will not match the classification of any newly installed applications.

To overcome such problems, methods and systems are described herein for automatically assigning application shortcuts to folders with user-defined names. In particular, the embodiments described herein provide for generating and maintaining a table of keywords associated with each folder with a user-defined name on a media device, the table including keywords associated with the applications whose shortcuts are assigned to the respective folders with user-defined names. A shortcut for a newly installed application is then assigned to a folder with a user-defined name associated with a keyword that matches a keyword associated with the newly installed application. For example, the list of keywords associated with each folder with a user-defined name on the media device may be generated and dynamically updated based on keywords associated with the types or categories of applications whose shortcuts are assigned to each folder with a user-defined name. The keywords associated with a folder with a user-defined name may further be determined based on the custom name assigned to the folder. In some embodiments, additional keywords provided by the user to be associated with the folders with user-defined names may be received by the media device. This greatly improves the user experience of the user of the media device by automatically determining which types of applications' shortcuts the user has grouped together in folders with user-defined names, and automatically assigning shortcuts for newly installed applications to the appropriate folders with user-defined names based on the user's custom sorting scheme.

In one illustrative embodiment, a system identifies a plurality of keywords associated with folders with user-defined names on a device. The system may identify keywords associated with a name of a folder with a user-defined name and/or identify keywords associated with a category of one or more applications corresponding to shortcuts assigned to the folder with a user-defined name. For example, if the name of the folder with a user-defined name is "yids," the system may determine that keywords such as "video," "streaming," "movies," "tv," "television," etc., are associated with the name "yids." Likewise, if the folder with a user-defined name includes a shortcut for an application associated with a category "social media," the system may determine that keywords such as "texting," "instant messaging," "video calling," "media sharing," etc., are associated with the category "social media." The system may then identify a keyword associated with an application being installed on the device and determine whether the keyword matches one of the keywords associated with a folder with a user-defined name on the device. In the event that the system determines there is a match between a keyword associated with the application and one of the keywords associated with a folder with a user-defined name on the device, the system adds the shortcut for the application to the folder with a user-defined name corresponding to the matching keyword.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3B shows a workflow of an illustrative process for generating a list of keywords associated with folders with user-defined names on a device, in accordance with some embodiments of the disclosure;

FIG. 8 is a flowchart of a detailed illustrative process for identifying an application category associated with an application corresponding to a shortcut in a given folder with a user-defined name, in accordance with some embodiments of the disclosure;

DETAILED DESCRIPTION

Figure 1:
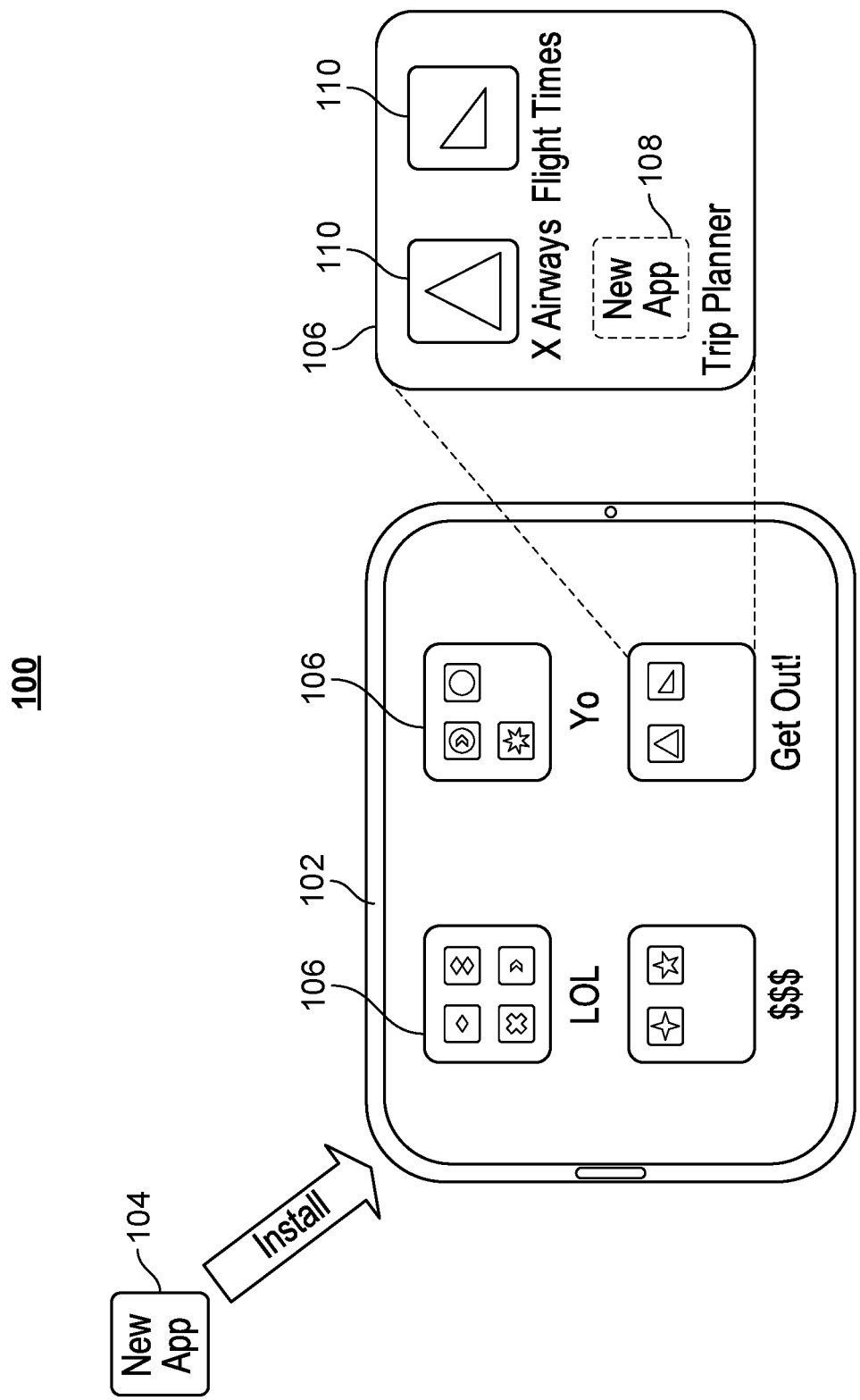
FIG. 1 shows an illustrative scenario for automatically assigning application shortcuts to folders with user-defined names, in accordance with some embodiments of the disclosure.

FIG. 1 shows an illustrative scenario 100 for automatically assigning application shortcuts to folders with user-defined names. In FIG. 1, a media device 102 is installing a new application 104, and a shortcut 108 for the application 104 is assigned to one of the folders 106. The media device 102 may be any device with a user-definable folder system and on which applications may be installed, such as a smartphone, a personal computer (PC), a laptop computer, a tablet computer, a handheld computer, a personal digital assistant (PDA), a smart television (TV), a set-top box, an integrated receiver decoder (IRD) for handling satellite television, a digital media receiver (DMR), a streaming media device, a WebTV box, a personal computer television (PC/TV), a wearable computer, an automotive media system, and/or any other computing equipment with a customizable file system and/or directory structure that may be configured to install applications. As described further below, the media device 102 is configured to display a graphical user interface (GUI) that shows the shortcut 108 for the newly installed application 104, as well as shortcuts 110 for applications already installed on the media device 102.

The application 104 may be any application that is capable of being installed onto the media device 102, and for which a shortcut 108 will be shown in the GUI displayed by the media device 102. In some embodiments, the application 104 is downloaded from an application store or other repositories prior to being installed onto the media device 102. The application 104 may include or be associated with metadata including a classification or other data indicating a type and/or category of the application 104. The metadata may further include keywords associated with the application 104. In some embodiments, the metadata is stored in storage associated with the application store or other repositories and is retrieved by the media device 102 together with or separately from the application 104. The storage associated with the application store or other repositories may further store release notes, a user manual, and/or other documentation or publications associated with the application 104.

The folders 106 are folders with user-defined names, that is, folders to which a user of the media device 102 has assigned custom names (e.g., "LOL," "Yo," "$$$," and "Get out!," as shown in FIG. 1). Each folder 106 includes shortcuts 110 for other applications previously installed on the media device 102.

Prior to, during, and/or shortly after installing the application 104, the media device 102 identifies one or more keywords associated with the application 104, determines whether at least one of the keywords associated with the application 104 matches a keyword associated with one of the folders 106 with user-defined names, and when a match is found, assigns the shortcut 108 for the application 104 to the folder with a user-defined name associated with the matching keyword, as further described below with reference to FIGS. 4-11.

Figure 2:
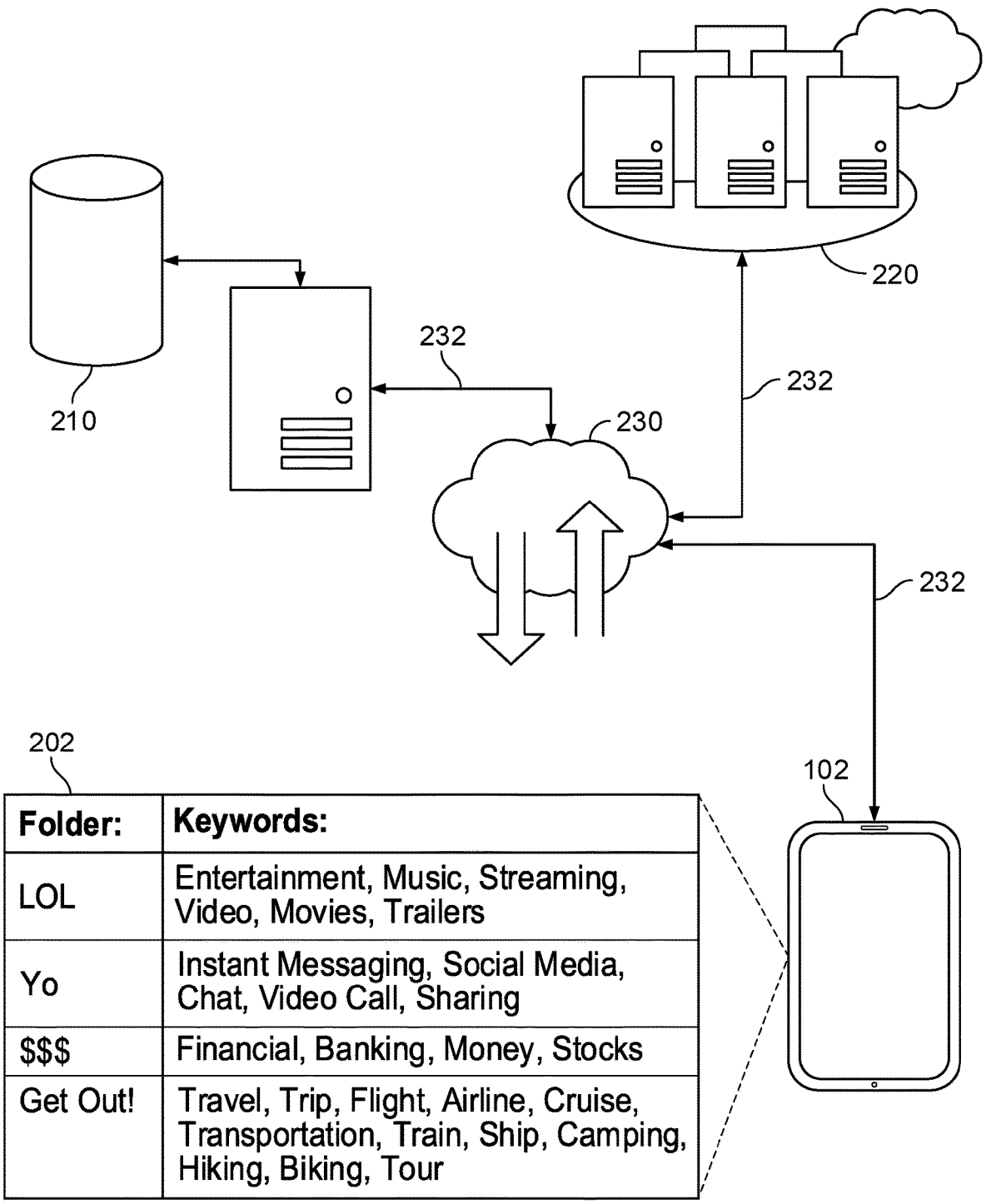
FIG. 2 shows an illustrative system for automatically assigning application shortcuts to folders with user-defined names, in accordance with some embodiments of the disclosure.

FIG. 2 shows an illustrative system for automatically assigning application shortcuts to folders with user-defined names. In particular, FIG. 2 shows a system 200 where the media device 102 retrieves the application 104 and/or the metadata associated with the application 104 from a content source 210 via a communications path 232. The content source 210 may be any server or other computing device by means of which a content provider provides applications 104 and/or related metadata associated with the applications 104, either together with or separate from the applications 104, to the media device 102. For example, the content source 210 may be a cloud storage platform by means of which an application store distributes an application 104 to a media device 102. In that regard, the communications path 232 may be any network or communication equipment or medium by means of which the media device 102 can communicate (e.g., submit a query to and/or retrieve data or content from) the content source 210. In one illustrative example, the communications path 232 includes devices connected via the Internet.

A keyword generation application may be implemented on any one or a combination of the media device 102, the content source 210, and/or an application server 220, each of which may function as a stand-alone device or may be part of a network of devices. Various network configurations of devices may be implemented and are discussed in more detail below. In the system 200, there may be multiple media devices 102, but only one is shown in FIG. 2 to avoid overcomplicating the drawing. In addition, multiple users may each utilize more than one type of media device 102 and also more than one of each type of media device 102, as described above.

The media device 102 may be coupled to a communication network 230. The communication network 230 may be one or more networks including the Internet, mobile phone network, mobile voice or data network (e.g., a 4G or LTE network), cable network, public switched telephone network, or other types of communication network or combinations of communication networks. The media device 102, the content source 210, and the application server 220 may be connected to the communication network 230 via one or more communications paths 232, such as a satellite path, a fiber-optic path, a cable path, a path that supports Internet communications (e.g., IP), free-space connections (e.g., for wireless signals), and/or any other suitable wired or wireless communications path or combination of such paths.

Although communications paths 232 are not drawn directly between the media device 102 and the content source 210 or the application server 220, these devices may communicate directly with each other via communications paths 232, such as short-range point-to-point communications paths, such as USB cables, IEEE 1394 cables, wireless paths (e.g., BLUETOOTH, infrared, IEEE 802-11x, etc.), or other short-range communication via wired or wireless paths. BLUETOOTH is a certification mark owned by Bluetooth SIG, INC. The devices may also communicate with each other directly through an indirect path via the communication network 230.

The system 200 may include more than one content source 210, but only one is shown in FIG. 2 to avoid overcomplicating the drawing. The media device 102 includes a database, table, or other data structure, (referred to hereinafter as database 202) storing a list of each folder 106 on the media device 102, and/or a list of keywords associated with each folder 106. As described further below with reference to FIGS. 3-11, the media device 102 generates and maintains the lists of keywords associated with each folder 106 on the media device 102 and updates the lists of keywords each time a new application 104 is installed or a shortcut 110 corresponding to a previously installed application is moved to a different folder 106. As shown in FIG. 2, the database 202 includes entries for the folders 106 with user-defined names "LOL," "Yo," "$$$," and "Get out!" For each folder 106, the database 202 includes entries for a plurality of associated keywords, (e.g., "Entertainment," "Music," "Streaming," "Video," "Movies," and "Trailers" for the folder 106 named "LOL;" "Instant Messaging," "Social Media," "Chat," "Video Call," and "Sharing" for the folder 106 named "Yo;" "Financial," "Banking," "Money," and "Stocks" for the folder 106 named "$$$;" and "Travel," "Trip," "Flight," "Airline," "Cruise," "Transportation," "Train," "Ship," "Camping," "Hiking," "Biking," and "Tour" for the folder 106 named "Get out!"). Those skilled in the art will appreciate that the folder names and associated keywords shown in FIG. 2 are merely examples, and that the database 202 may include additional entries for other folders 106 with other names, and/or additional or different entries for keywords associated with each of the folders 106.

The content source 210 may include a database storing metadata associated with each application 104 provided by the content source 210. The metadata may include keywords and/or application classification (e.g., application type or category) information associated with each application 104. The content source 210, either in the database or in a separate data structure, stores the applications 104 referred to in the database, or stores links (e.g., hyperlinks, addresses, credentials, etc.) to access the applications 104 referred to in the database on a separate device or server (not shown in FIG. 2).

The keyword generation application may be, for example, a stand-alone application implemented on the media device 102 described above. For example, the keyword generation application may be implemented as software or a set of executable instructions which may be stored in storage 308 (described below with reference to FIG. 3A) and executed by control circuitry 304 (described below with reference to FIG. 3A) of the media device 102. In some embodiments, the keyword generation application is a client/server-based application where only a client application resides on the media device 102, and a server application resides on the application server 220. For example, a keyword generation application may be implemented partially as a client application on the control circuitry 304 of the media device 102 and partially on the application server 220 as a server application running on the control circuitry 304 of the application server 220. When executed by the control circuitry 304 of the application server 220, the keyword generation application may instruct the control circuitry 304 of the media device 102 to transmit a name assigned to a given folder 106 with a user-defined name and a list of applications for which shortcuts 110 were assigned to the given folder 106 with a user-defined name, to the application server 220, which then identifies or generates keywords associated with the given folder 106 with a user-defined name, and transmits the identified or generated keywords back to the media device 102 to be stored in the database 202.

While system 200 is shown in FIG. 2 as including only the media device 102, the content source 210, and the application server 220, those skilled in the art will appreciate that the system 200 may further include various other devices. In some embodiments, the media device 102 may operate in a cloud computing environment to access cloud services. In a cloud computing environment, various types of computing services for content sharing, storage, or distribution are provided by a collection of network-accessible computing and storage resources, referred to as "the cloud." The media device 102 may be a cloud client that relies on cloud computing for application delivery, or the media device 102 may have some functionality without access to cloud resources. For example, some applications running on the media device 102, such as the keyword generation application, may be cloud applications, that is, applications delivered as a service over the Internet, while other applications may be stored and run on the media device 102. In some embodiments, the media device 102 uses cloud resources for processing operations, such as the processing operations performed by the processing circuitry 306 described in relation to FIG. 3A. For example, the media device 102 may rely on the application server 220 and/or another cloud resource to identify keywords associated with the folders 106 with user-defined names and/or to identify keywords associated with an application 104.

Figure 3A:
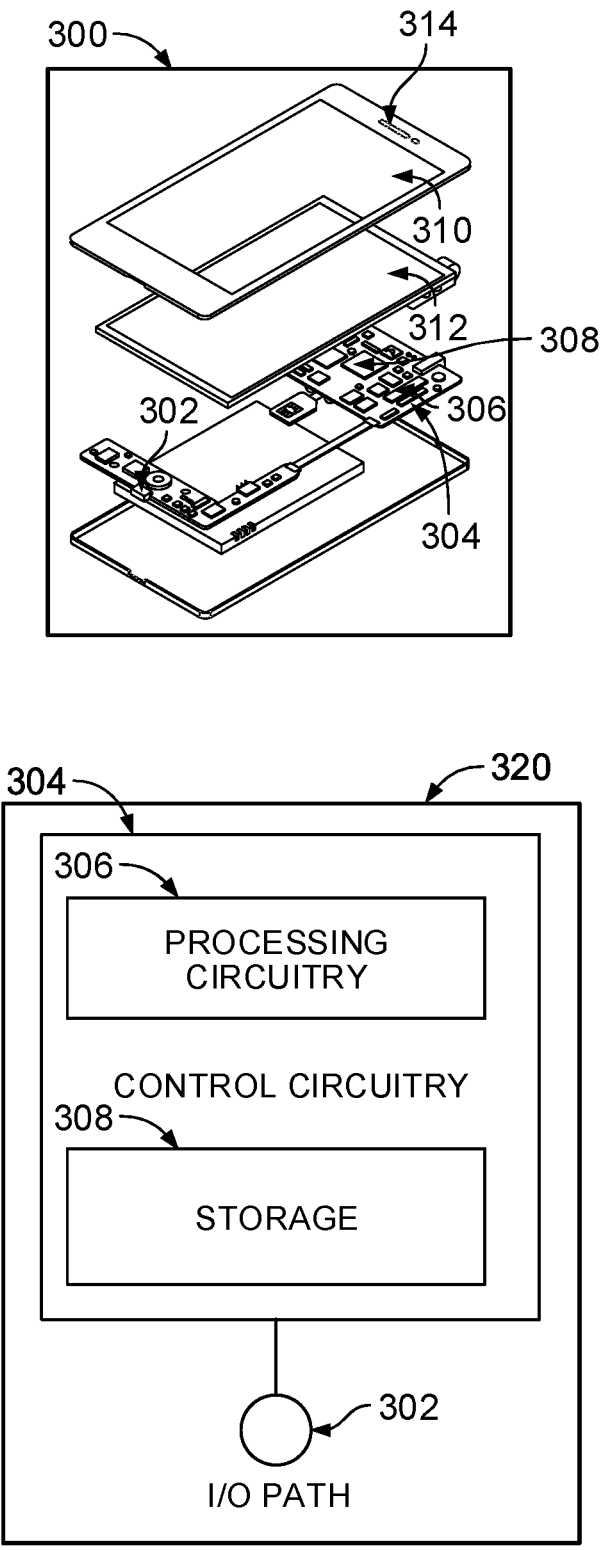
FIG. 3A shows a diagram of illustrative devices of the system of FIG. 2, in accordance with some embodiments of the disclosure.

FIG. 3A shows a generalized embodiment of an illustrative media device 300. As depicted, the media device 300 may be a smartphone or tablet. The media device 300 may receive content and data via an input/output (hereinafter "I/O") path 302. The I/O path 302 may provide user input, user preferences, applications 104, keywords associated with the applications 104, and/or metadata related to any of the aforementioned to control circuitry 304, which includes processing circuitry 306 and storage 308. The control circuitry 304 may send and receive commands, requests, and other suitable data using the I/O path 302. The I/O path 302 may connect the control circuitry 304 (and specifically the processing circuitry 306) to one or more communications paths (described below). I/O functions may be provided by one or more of these communications paths but are shown as a single path in FIG. 3A to avoid overcomplicating the drawing.

The control circuitry 304 may be based on any suitable processing circuitry, such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, the control circuitry 304 executes instructions for a keyword generation application stored in memory (i.e., the storage 308). Specifically, the control circuitry 304 may be instructed by the keyword generation application to parse release notes, user manuals, and/or other documentation or publications associated with an application 104 to generate metadata related to the application 104 and/or identify or generate keywords associated with the application 104, and/or perform the other functions described above and below.

In client/server-based embodiments, the control circuitry 304 includes communications circuitry suitable for communicating with a keyword generation application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths. In addition, the communications circuitry may include circuitry that enables peer-to-peer communication of media devices, or communication of media devices in locations remote from each other.

The memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, or any other suitable fixed or removable storage devices, and/or any combination of the same. Nonvolatile memory may also be used. Cloud-based storage, described in relation to FIG. 2, may be used to supplement the storage 308 or instead of the storage 308.

The circuitry described herein may be implemented using software running on one or more general purpose or specialized processors. Multiple circuits may be provided to handle simultaneous processing functions. If the storage 308 is provided as a separate device from the media device 300, the circuitry may be associated with the storage 308.

A user may send instructions to the control circuitry 304 using a user input interface 310 of the media device 300. The user input interface 310 may be any suitable user interface, such as a remote control, mouse, trackball, keypad, keyboard, touchscreen, touchpad, stylus input, joystick, or other user input interfaces. Display 312 may be a touchscreen or touch-sensitive display. In such circumstances, user input interface 310 may be integrated with or combined with the display 312. A camera, microphone, or other visual or voice recognition interface may also be used to receive user input and/or identify the user. Speakers 314 may be provided as integrated with other elements of the media device 300.

The keyword generation application may be implemented using any suitable architecture. For example, it may be a stand-alone application wholly implemented on the media device 300. The keyword generation application and/or any instructions for performing any of the embodiments discussed herein may be encoded on computer-readable media. Computer-readable media includes any media capable of having computer-executable instructions encoded thereon that, when executed by a processor, cause a device, such as media device 300, to perform the instructed operations. In some embodiments, the keyword generation application is a client/server-based application. Data for use by a thick or thin client implemented on the media device 300 is retrieved on demand by issuing requests to a server remote to the media device 300, as described above. For example, the media device 300 may receive inputs from the user via the input interface 310 or the microphone and transmit those inputs to the remote server (e.g., the application server 220) for processing and retrieving or generating the outputs or data (e.g., the keywords). The keywords are then transmitted to the media device 300 to be stored in the database 202. Those skilled in the art will appreciate that the media device 102 of FIG. 1 may be implemented as the media device 300 of FIG. 3.

FIG. 3B shows a workflow of an illustrative process for generating a list of keywords associated with folders with user-defined names on a device, in accordance with some embodiments of the disclosure. A parser 358 (e.g., a software process analyzing natural language text) executed by the control circuitry 304 receives as input release notes 352 (such as textual documents provided with an application 104 upon initial or subsequent distribution of the application 104), user manuals 354 (such as a description provided by a distributor of the application 104 describing the use and functionality of the application 104), and/or other documentation or publications 356 related to the application 104. The release notes 352, user manuals 354, and other documentation or publications 356 may be packaged with the application 104 and/or may be stored and retrieved from the content source 210 separately from the application 104. The parser 358 is configured to parse (e.g., syntactically analyze the natural language text included in) the release notes 352, user manual 354, and/or other documentation or publications 356 to identify key terms, words, phrases, or other descriptions of the functionality of the application 104 in the release notes 352, user manual 354, and/or other documentation or publications 356.

When the parser 358 identifies such key terms, words, phrases, or other descriptions of the functionality of the application 104, the parser 358 provides these key terms, words, phrases, or other descriptions as output to a metadata generation engine 362 also executed by the control circuitry 304. The metadata generation engine 362 compares the key terms, words, phrases, or other descriptions of the functionality of the application 104 with keywords included in a keyword database 368 to determine whether one or more keywords are associated with the functionality of the application 104. When the metadata generation engine 362 determines that there are existing keywords in the keyword database 368 that are associated with the functionality of the application 104, the metadata generation engine 362 generates as output metadata 364 associating those keywords with the application 104. When the metadata generation engine 362 determines that there are no existing keywords in the keyword database 368 that are associated with the functionality of the application 104, the metadata generation engine 362 generates new keywords to be associated with the application 104 and generates as output the metadata 364 associating those newly generated keywords with the application 104. The newly generated keywords may then be stored into the keyword database 368. When generating new keywords to be associated with the application 104, the metadata generation engine 362 may retrieve data from other external sources (not shown in FIG. 3B) to identify potential keywords that are relevant to the functionality of the application 104. The metadata generation engine 362 may further receive user input 360 identifying keywords associated with the functionality of the application 104.

Once generated, the metadata 364 is provided as input to one or more machine learning algorithms 366 that operate in conjunction with the metadata generation engine 362 to train the metadata generation engine 362 in associating particular keywords with application functionalities. The machine learning algorithms 366 may further be used to verify the association of the keywords with the application functionality to confirm that the appropriate keywords have been associated with the application 104. The machine learning algorithms 366 then provide as output the keywords and their associated application functionality back to the keyword database 368, from where the keywords may again be retrieved by the metadata generation engine 362 when metadata 364 is generated for additional applications 104.

Figure 4A:
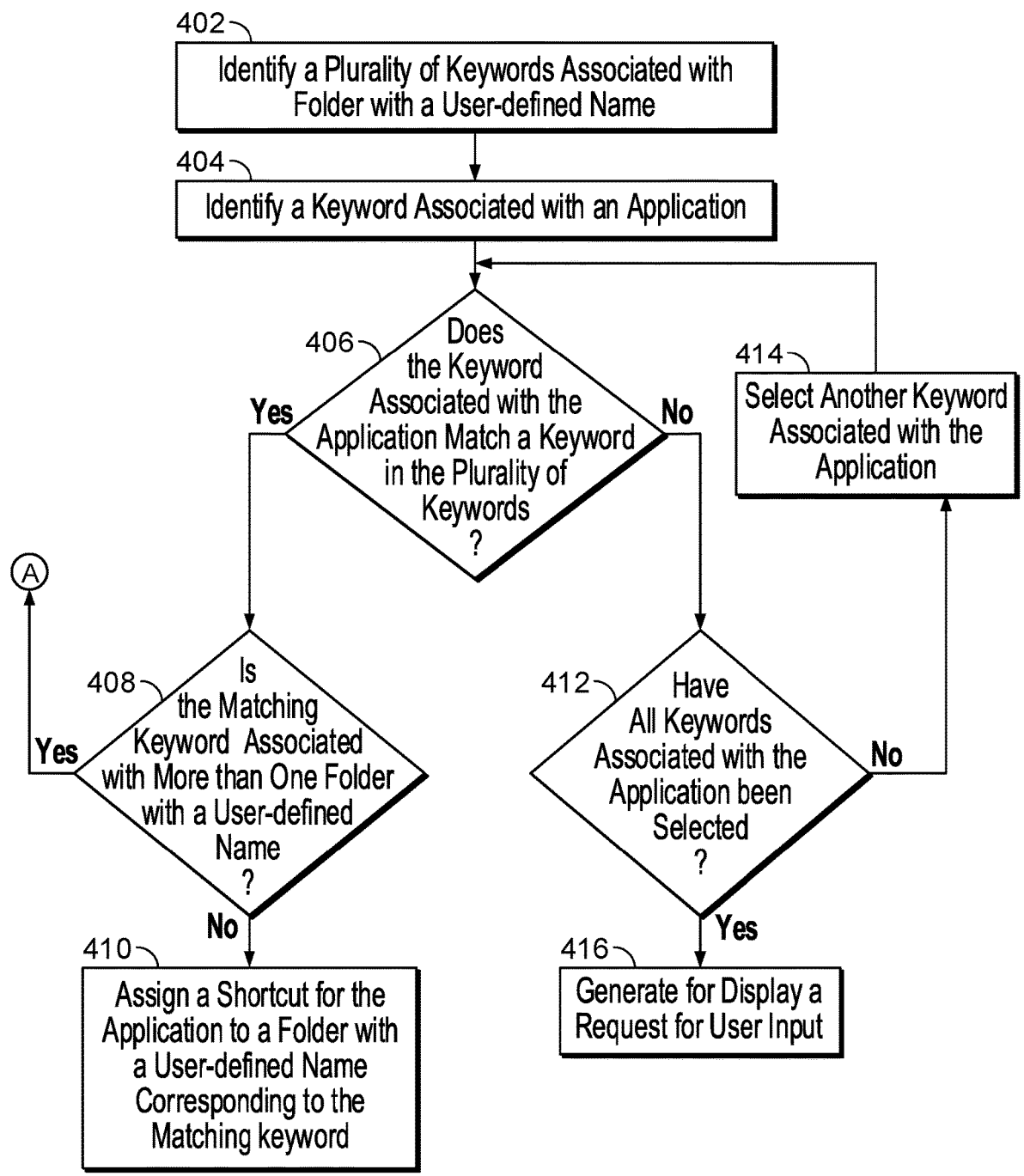
FIGS. 4A and 4B show a flowchart of an illustrative process for automatically assigning application shortcuts to folders with user-defined names, in accordance with some embodiments of the disclosure.
Figure 4B:
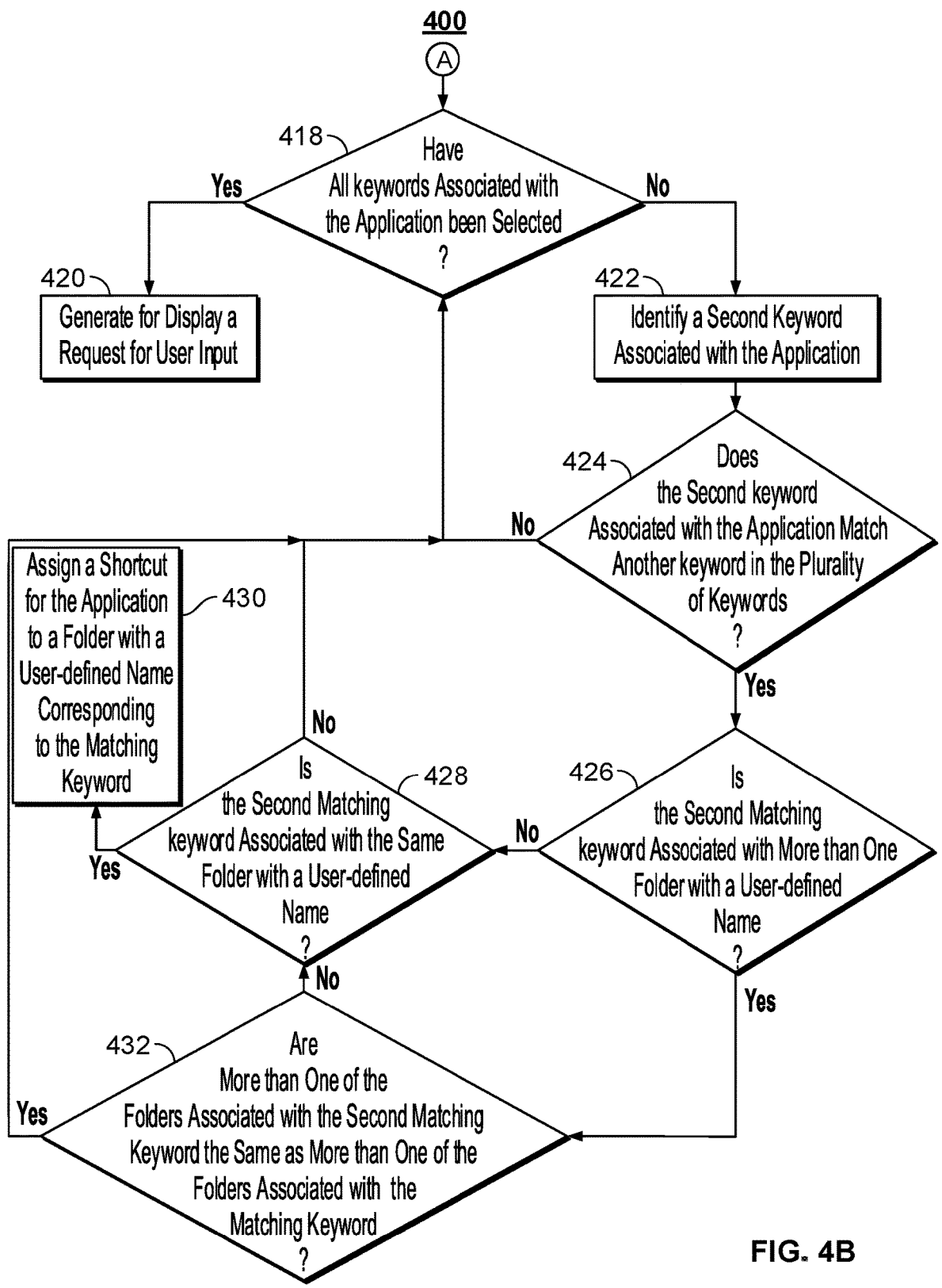

FIGS. 4A and 4B show a flowchart of an illustrative process for automatically assigning application shortcuts to folders with user-defined names, in accordance with some embodiments of the disclosure. Starting with FIG. 4A, a process 400 for automatically assigning application shortcuts to folders with user-defined names may begin at block 402, where control circuitry, such as the control circuitry 304, identifies a plurality of keywords associated with custom-named folders, such as the folders 106 with user-defined names. For example, the control circuitry 304 of the media device 102 may identify keywords associated with the names assigned to the folders 106 with user-defined names, as described further below with reference to FIG. 5, and/or based on application categories of applications corresponding to shortcuts 110 in the folders 106 with user-defined names, as described further below with reference to FIG. 7. The process by which the control circuitry 304 identifies the plurality of keywords associated with the folders 106 with user-defined names is also further described above with reference to FIG. 3B.

At block 404, the control circuitry 304 identifies a keyword associated with an application 104. For example, the control circuitry 304 may retrieve metadata associated with the application 104 and identify the keyword associated with the application 104 based on the metadata, as described further below with reference to FIG. 11. Additionally, or alternatively, the control circuitry 304 may parse release notes, user manuals, and/or other documentation or publications associated with the application 104 to identify a keyword associated with the application 104, as further described above with reference to FIG. 3B. In some embodiments, the control circuitry 304 may identify a plurality of keywords associated with the application 104. In such embodiments, the control circuitry 304 may select one of the keywords associated with the application 104 for an initial iteration of the process 400 and may return to select the other keywords associated with the application for subsequent iterations of the process 400, as described further below.

At block 406, the control circuitry 304 determines whether the keyword associated with the application 104, as identified at block 404, matches a keyword in the plurality of keywords associated with the folders 106 with user-defined names, as identified at block 402. For example, the control circuitry 304 may compare the keyword associated with the application 104 to some or all of the plurality of keywords associated with the folders 106 with user-defined names to determine whether any of the keywords match. In response to determining that the keyword associated with the application 104 matches one of the keywords in the plurality of keywords associated with the folders 106 with user-defined names, the process 400 proceeds to block 408. In response to determining that the keyword associated with the application 104 does not match any of the keywords in the plurality of keywords associated with the folders 106 with user-defined names, the process 400 proceeds to block 412.

At block 408, the control circuitry 304 determines whether the matching keyword is associated with more than one folder 106 with a user-defined name. For example, multiple folders 106 with user-defined names may be associated with the same keyword as a result of a user having sorted shortcuts for applications 104 of the same or similar types or categories into separate folders 106 with user-defined names, as further explained below with reference to FIGS. 6B and 7. In such embodiments, the control circuitry 304 may retrieve a list of folders 106 with user-defined names associated with the matching keyword in order to determine whether the matching keyword is associated with multiple folders 106 with user-defined names. In response to determining that the matching keyword is not associated with more than one folder 106 with a user-defined name, the process 400 proceeds to block 410. In response to determining that the matching keyword is associated with more than one folder 106 with a user-defined name, the process 400 proceeds to block 418.

At block 410, the control circuitry 304 assigns a shortcut 108 for the application 104 to a folder 106 with a user-defined name corresponding to the matching keyword. For example, the control circuitry 304 may add a pointer to the application 104 to the folder 106 with a user-defined name associated with the matching keyword, thereby causing the GUI of the media device 102 to display the shortcut 108 for the application 104 in the folder 106 with a user-defined name associated with the matching keyword. In the example shown in FIG. 1, the control circuitry 304 assigns the shortcut 108 for the application "Trip Planner" to the folder 106 with a user-defined name "Get out!"

At block 412, the control circuitry 304 determines whether all keywords associated with the application 104 have been selected. For example, the control circuitry 304 may determine whether all of the keywords identified at block 404 have been selected. In some embodiments, the control circuitry 304 may identify a list of keywords associated with the application 104 at block 404 and may sequentially select a next keyword in the list during each iteration of the process 400. In response to determining that all keywords associated with the application 104 have not been selected, the process 400 proceeds to block 414. In response to determining that all keywords have been selected, the process 400 proceeds to block 416.

At block 414, the control circuitry 304 selects another keyword associated with the application 104. For example, the control circuitry 304 may select the next keyword in the list of keywords associated with the application 104 as identified at block 404.

At block 416, the control circuitry 304 generates for display a request for user input. For example, the control circuitry 304 may generate a prompt, alert, or other notification requesting user input regarding a keyword to associate with the application 104, and cause a user interface, such as display 312, to display the generated prompt, alert, or other notification.

Turning now to FIG. 4B, at block 418, the control circuitry 304 determines whether all keywords associated with the application 104 have been selected. For example, the control circuitry 304 may determine whether all of the keywords identified at block 404 have been selected. In some embodiments, the control circuitry 304 may identify a list of keywords associated with the application 104 at block 404 and may sequentially select a next keyword in the list during each iteration of the process 400. In response to determining that all keywords associated with the application 104 have not been selected, the process 400 proceeds to block 420. In response to determining that all keywords have been selected, the process 400 proceeds to block 422.

At block 420, the control circuitry 304 generates for display a request for user input. For example, the control circuitry 304 may generate a prompt, alert, or other notification requesting user input regarding a keyword to associate with the application 104, and cause a user interface, such as display 312, to display the generated prompt, alert, or other notification.

At block 422, the control circuitry 304 selects another keyword associated with the application 104. For example, the control circuitry 304 may select the next keyword, in the list of keywords associated with the application 104, as identified at block 404.

At block 424, the control circuitry 304 determines whether the second keyword associated with the application 104, as identified at block 422, matches another keyword in the plurality of keywords, as identified at block 402. For example, the control circuitry 304 may compare the second keyword associated with the application 104 to some or all of the plurality of keywords associated with the folders 106 with user-defined names to determine whether any of the keywords match. In response to determining that the second keyword associated with the application 104 matches one of the keywords in the plurality of keywords associated with the folders 106 with user-defined names, the process 400 proceeds to block 426. In response to determining that the second keyword associated with the application 104 does not match any of the keywords in the plurality of keywords associated with the folders 106 with user-defined names, the process 400 returns to block 418.

At block 426, the control circuitry 304 determines whether the second matching keyword is associated with more than one folder 106 with a user-defined name. For example, the control circuitry 304 may retrieve a list of folders 106 with user-defined names associated with the second matching keyword. In response to determining that the second matching keyword is not associated with more than one folder 106 with a user-defined name, the process 400 proceeds to block 428. In response to determining that the second matching keyword is associated with more than one folder 106 with a user-defined name, the process 400 proceeds to block 432.

At block 428, the control circuitry 304 determines whether the second matching keyword is associated with the same folder 106 with a user-defined name as the folder 106 with a user-defined name associated with the first matching keyword, as determined at block 406. For example, the control circuitry 304 may compare the name or another identifier associated with the folder 106 with a user-defined name associated with the second matching keyword and the name or another identifier associated with the folder 106 with a user-defined name associated with the first matching keyword to determine if the folders are the same. In response to determining that the second matching keyword is associated with the same folder 106 with a user-defined name as the folder 106 with a user-defined name associated with the first matching keyword, the process 400 proceeds to block 430. In response to determining that the second matching keyword is not associated with the same folder 106 with a user-defined name as the folder 106 with a user-defined name associated with the first matching keyword, the process 400 returns to block 418.

At block 430, the control circuitry 304 assigns a shortcut 108 for the application 104 to a folder 106 with a user-defined name corresponding to the first matching keyword and the second matching keyword. For example, the control circuitry 304 may add a pointer to the application 104 to the folder 106 with a user-defined name associated with the matching keywords, thereby causing the GUI of the media device 102 to display the shortcut 108 for the application 104 in the folder 106 with a user-defined name associated with the matching keywords.

At block 432, the control circuitry 304 determines whether more than one of the folders associated with the second matching keyword are the same as more than one of the folders associated with the first matching keyword. For example, the control circuitry 304 may compare the names or other identifiers associated with the folders 106 with user-defined names associated with the second matching keyword and the names or other identifiers associated with the folders 106 with user-defined names associated with the first matching keyword to determine if the folders are the same. In response to determining that the second matching keyword is associated with more than one of the same folders 106 with user-defined names as the folders 106 with user-defined names associated with the first matching keyword, the process 400 returns to block 418. In response to determining that the second matching keyword is not associated with more than one of the same folders 106 with user-defined names as the folders 106 with user-defined names associated with the first matching keyword, the process 400 proceeds to block 428.

Figure 5:
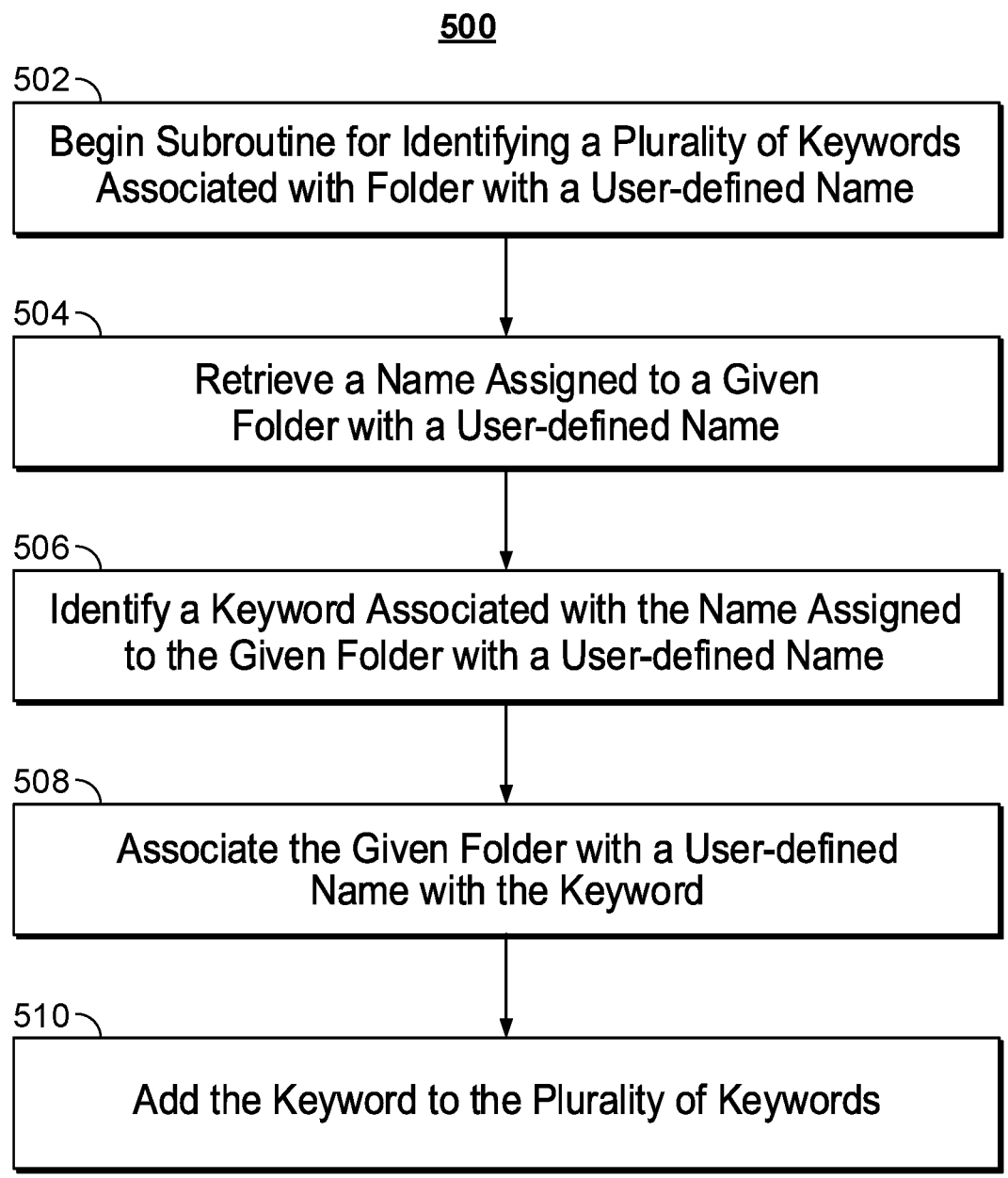
FIG. 5 is a flowchart of a detailed illustrative process for identifying a plurality of keywords associated with folders with user-defined names, in accordance with some embodiments of the disclosure.

FIG. 5 is a flowchart of a detailed illustrative process for identifying a plurality of keywords associated with folders with user-defined names, in accordance with some embodiments of the disclosure. A process 500 for identifying a plurality of keywords associated with folders 106 with user-defined names may begin at block 502. At block 504, the control circuitry 304 retrieves a name assigned to a given folder 106 with a user-defined name. For example, the control circuitry 304 may retrieve a table or other data structure listing the names assigned to the folders on the media device 102 and retrieve the name assigned to the given folder 106 with a user-defined name from the table. In one illustrative embodiment, the control circuitry 304 retrieves the name "tunes" assigned to one of the folders 106 with user-defined names on the media device 102.

At block 506, the control circuitry 304 identifies a keyword associated with the name assigned to the given folder 106 with a user-defined name. For example, the control circuitry 304 may compare the name assigned to the given folder 106 with a user-defined name, as retrieved at block 504, with a list of folder names for which keywords were previously determined, and select a keyword associated with a matching folder name in the list, as further described below with reference to FIG. 6A. The list of folder names for which keywords were previously determined may be specific to the media device 102 and/or the user (i.e., stored in a profile associated with the user), or may be a public list maintained by an external source (such as the content source 210) that is available to all media devices 102. In the illustrative embodiment described above, the control circuitry 304 determines that the name "tunes" is in the list of folder names for which keywords were previously determined, and retrieves, from the list, the keyword "music" that was previously associated with the name "tunes."

At block 508, the control circuitry 304 associates the given folder 106 with a user-defined name with the keyword identified at block 506. For example, the control circuitry 304 may generate a metadata association between the keyword and the given folder 106 with a user-defined name. In some embodiments, the control circuitry 304 maintains a table or other data structure listing keywords that are associated with particular words or phrases used in folder names. In such embodiments, the control circuitry 304 may add the keyword identified at block 506 to the list of keywords associated with the words or phrases used in the name assigned to the given folder 106 with a user-defined name.

At block 510, the control circuitry 304 adds the keyword to the plurality of keywords. For example, the control circuitry 304 may perform the process 500 repeatedly until all keywords associated with the name assigned to the given folder 106 with a user-defined name have been identified. After each iteration, the control circuitry 304 may add the keyword identified at block 506 to a list of keywords associated with the given folder 106 with a user-defined name. Such a list may subsequently be retrieved when block 402 of process 400 is performed.

Figure 6A:
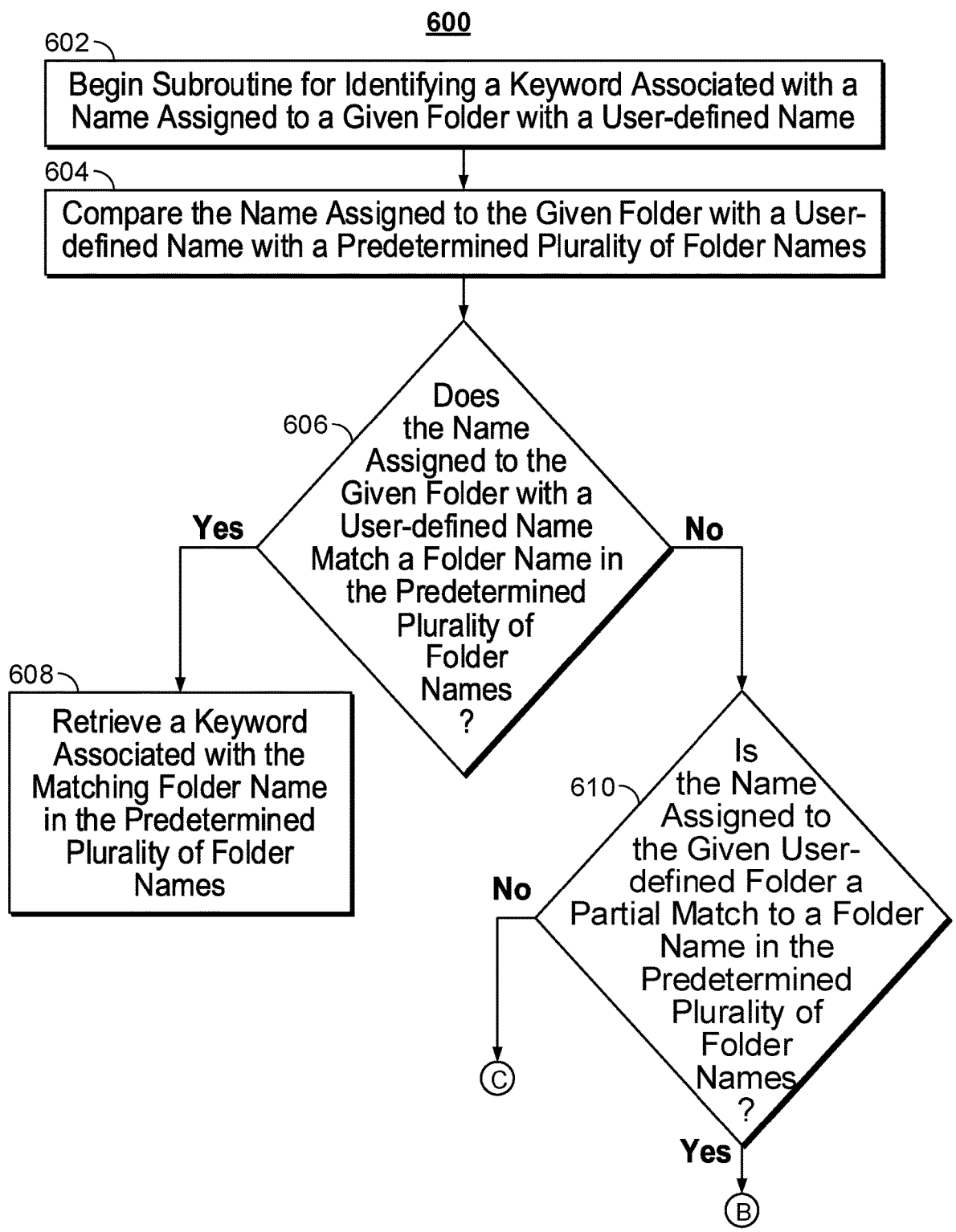
FIGS. 6A-C show a flowchart of a detailed illustrative process for identifying a keyword associated with a name assigned to a given folder with a user-defined name, in accordance with some embodiments of the disclosure.
Figure 6B:
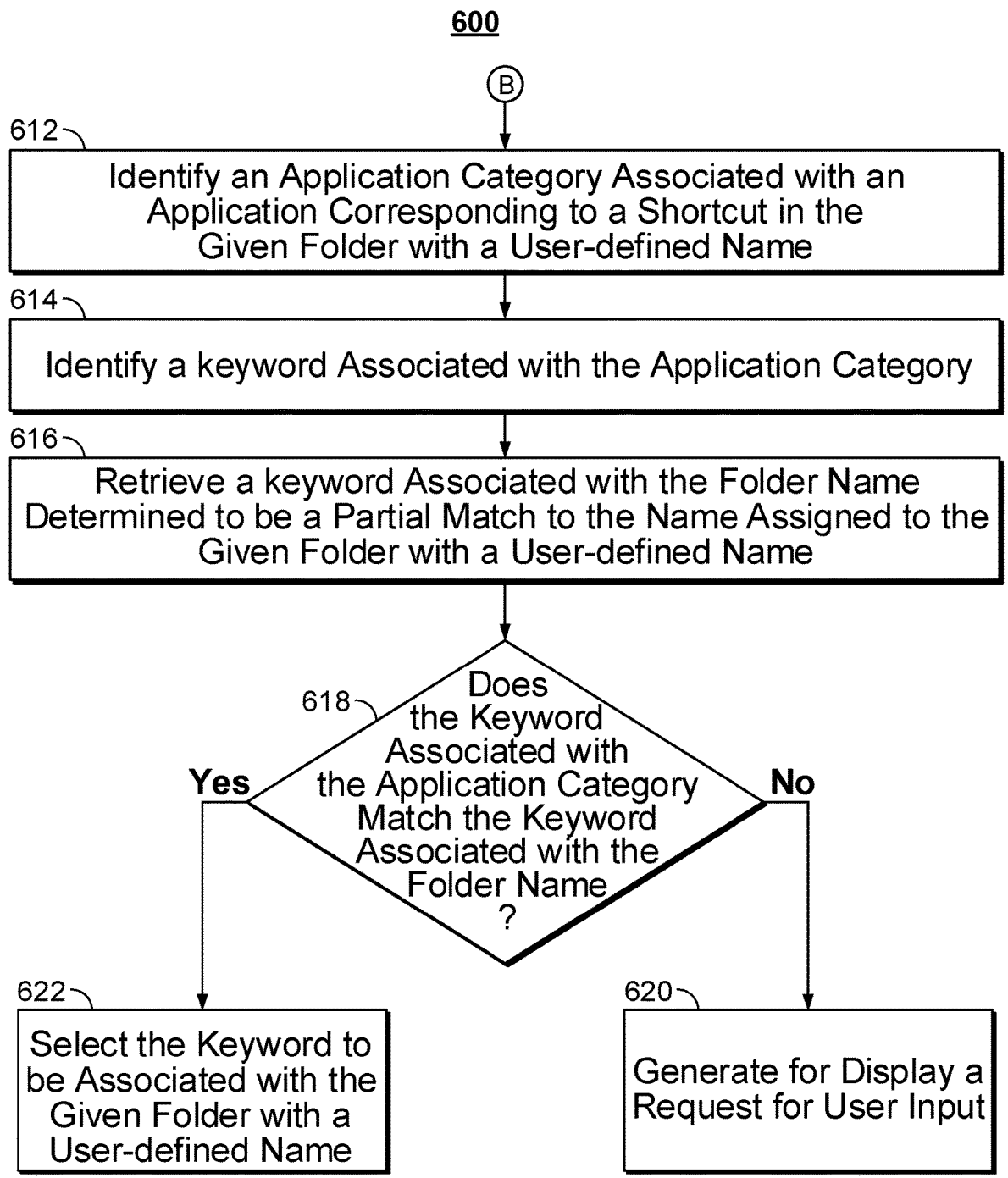
Figure 6C:
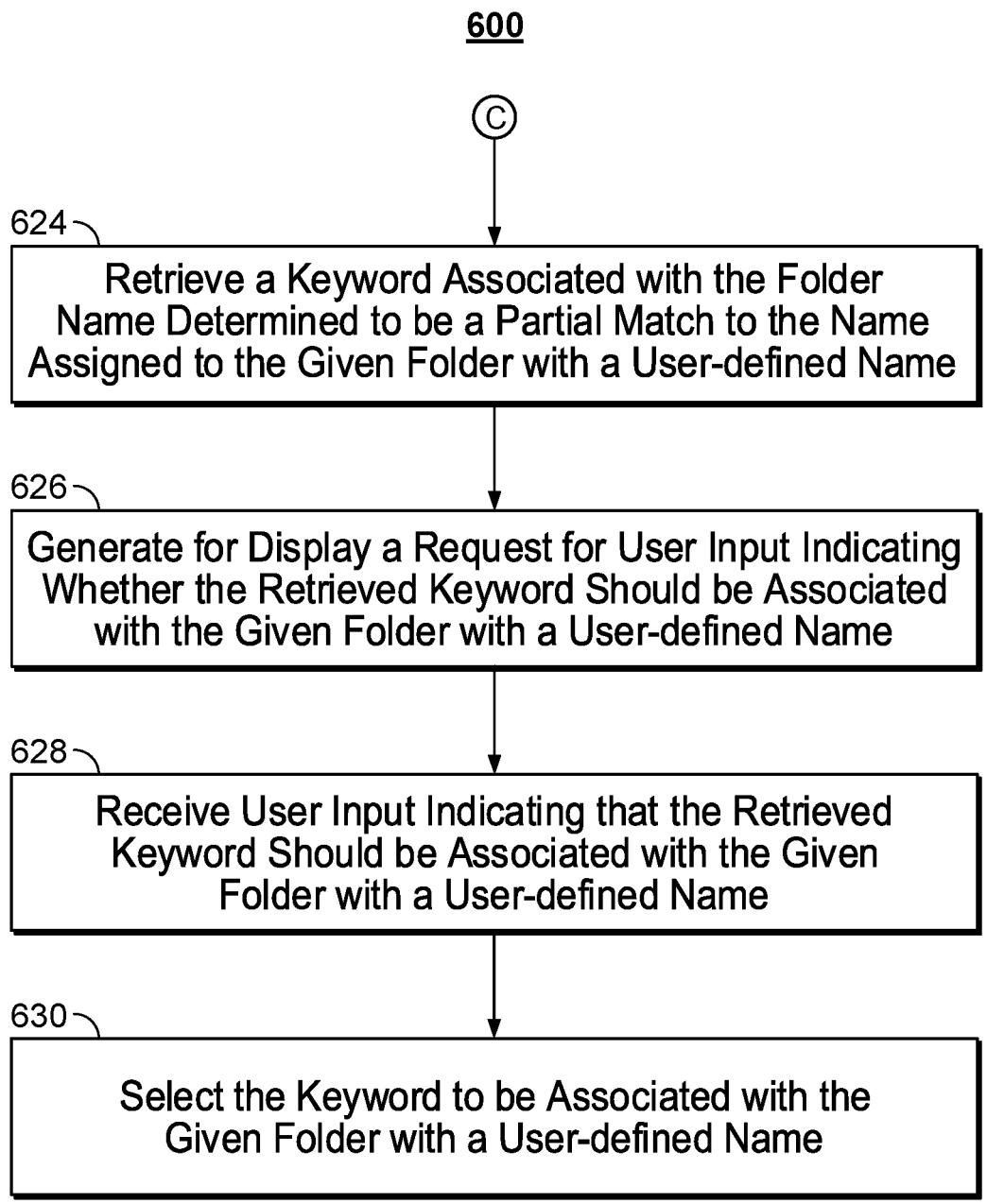

FIGS. 6A-C show a flowchart of a detailed illustrative process for identifying a keyword associated with a name assigned to a given folder with a user-defined name, in accordance with some embodiments of the disclosure. With reference to FIG. 6A, a process 600 for identifying a keyword associated with the name assigned to the given folder 106 with a user-defined name may begin at block 602. At block 604, the control circuitry 304 compares the name assigned to the given folder 106 with a user-defined name with a predetermined plurality of folder names. For example, the control circuitry 304 may retrieve a list of words and/or phrases that the user and/or other users have assigned to folders 106 with user-defined names and may compare the name assigned to the given folder 106 with a user-defined name to the words and/or phrases in the list. The list may be a global or public list maintained by an external source (such as content source 210) or may be a private list that is unique to the user and is stored in association with a profile of the user.

At block 606, the control circuitry 304 determines whether the name assigned to the given folder 106 with a user-defined name matches a folder name in the predetermined plurality of folder names. For example, the control circuitry 304 may determine, based on comparing performed at block 604, whether the name assigned to the given folder 106 with a user-defined name matches any of the words and/or phrases included in the list. In response to determining that the name assigned to the given folder 106 with a user-defined name matches a folder name in the predetermined plurality of folder names, the process 600 proceeds to block 608. In response to determining that the name assigned to the given folder 106 with a user-defined name does not match any folder name in the predetermined plurality of folder names, the process 600 proceeds to block 610.

At block 608, the control circuitry 304 retrieves a keyword associated with the matching folder name in the predetermined plurality of folder names. For example, the control circuitry 304 may retrieve, from the list, a keyword associated with the words and/or phrases that match the name assigned to the given folder 106 with a user-defined name.

At block 610, the control circuitry 304 determines whether the name assigned to the given folder 106 with a user-defined name is a partial match to a folder name in the predetermined plurality of folder names. For example, the control circuitry 304 may determine whether the name assigned to the given folder 106 with a user-defined name is a partial match to one or more of the words and/or phrases included in the list. In some embodiments, the name assigned to the given folder 106 with a user-defined name may be a shortened form or abbreviation of one or more of the words and/or phrases included in the list, and the control circuitry 304 may determine that the name assigned to the given folder 106 with a user-defined name is a partial match to one or more of the words and/or phrases when the shortened form of the words match. In response to determining that the name assigned to the given folder 106 with a user-defined name is a partial match to a folder name in the predetermined plurality of folder names, the process 600 proceeds to block 612. In response to determining that the name assigned to the given folder 106 with a user-defined name is not a partial match to any folder name in the predetermined plurality of folder names, the process 600 proceeds to block 624.

Turning now to FIG. 6B, at block 612, the control circuitry 304 identifies an application category associated with an application corresponding to a shortcut in the given folder 106 with a user-defined name. For example, the control circuitry 304 may retrieve the application category of the application corresponding to the shortcut 110 in the given folder 106 with a user-defined name based on metadata associated with the application.

At block 614, the control circuitry 304 identifies a keyword associated with the application category identified at block 612. For example, the control circuitry 304 may retrieve one or more keywords associated with the application category from the metadata and/or from an external source. In some embodiments, the control circuitry 304 maintains a list of keywords associated with application categories and may thus retrieve the keyword associated with the application category identified at block 612 from the list.

At block 616, the control circuitry 304 retrieves a keyword associated with the folder name determined to be a partial match to the name assigned to the given folder 106 with a user-defined name. For example, the control circuitry 304 may retrieve the keyword using any of the methods for retrieving keywords described herein.

At block 618, the control circuitry 304 determines whether the keyword associated with the application category matches the keyword associated with the folder name. For example, the control circuitry 304 may compare the two keywords to determine if they match. In response to determining that the keyword associated with the application category does not match the keyword associated with the folder name, the process 600 proceeds to block 620. In response to determining that the keyword associated with the application category matches the keyword associated with the folder name, the process 600 proceeds to block 622.

At block 620, the control circuitry 304 generates for display a request for user input. For example, the control circuitry 304 may generate a prompt, alert, or other notification requesting user input regarding a keyword to associate with the application 104, and cause a user interface, such as display 312, to display the generated prompt, alert, or other notification.

At block 622, the control circuitry 304 selects the keyword to be associated with the given folder 106 with a user-defined name. For example, the control circuitry 304 may add the keyword to a list of keywords associated with the given folder 106 with a user-defined name.

Turning now to FIG. 6C, at block 624, the control circuitry 304 retrieves a keyword associated with the folder name determined to be a partial match to the name assigned to the given folder 106 with a user-defined name. For example, the control circuitry 304 may retrieve the keyword using any of the methods for retrieving keywords described herein.

At block 626, the control circuitry 304 generates for display a request for user input indicating whether the retrieved keyword should be associated with the given folder 106 with a user-defined name. For example, the control circuitry 304 may generate a prompt, alert, or other notification requesting user input indicating whether the retrieved keyword should be associated with the given folder 106 with a user-defined name, and cause a user interface, such as display 312, to display the generated prompt, alert, or other notification.

At block 628, the control circuitry 304 receives user input indicating that the retrieved keyword should be associated with the given folder 106 with a user-defined name. For example, the control circuitry 304 may receive user input provided via the user input interface 310.

At block 630, the control circuitry selects the keyword to be associated with the given folder 106 with a user-defined name. For example, the control circuitry 304 may add the keyword to a list of keywords associated with the given folder 106 with a user-defined name.

Figure 7:
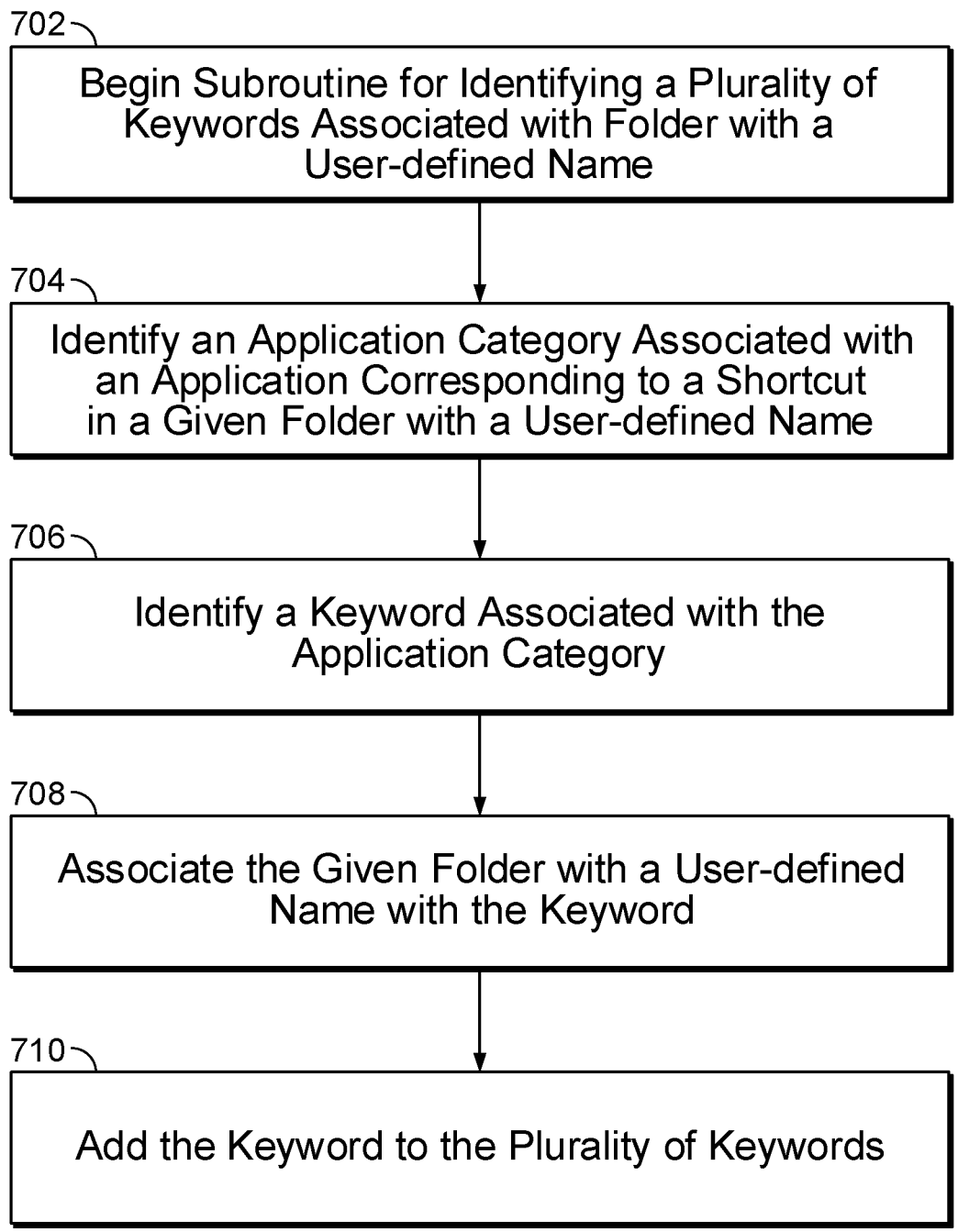
FIG. 7 is a flowchart of another detailed illustrative process for identifying a plurality of keywords associated with folders with user-defined names, in accordance with some embodiments of the disclosure.

FIG. 7 is a flowchart of a detailed illustrative process for identifying a plurality of keywords associated with folders with user-defined names, in accordance with some embodiments of the disclosure. A process 700 for identifying a plurality of keywords associated with folders 106 with user-defined names may begin at block 702. At block 704, the control circuitry 304 identifies an application category associated with an application corresponding to a shortcut in a given folder 106 with a user-defined name. For example, the control circuitry 304 may retrieve the application category of the application corresponding to the shortcut 110 in the given folder 106 with a user-defined name based on metadata associated with the application.

At block 706, the control circuitry 304 identifies a keyword associated with the application category identified at block 704. For example, the control circuitry 304 may retrieve one or more keywords associated with the application category from the metadata and/or from an external source. In some embodiments, the control circuitry 304 maintains a list of keywords associated with application categories and may thus retrieve the keyword associated with the application category identified at block 704 from the list.

At block 708, the control circuitry 304 associates the given folder 106 with a user-defined name with the keyword identified at block 706. For example, the control circuitry 304 may generate a metadata association between the keyword and the given folder 106 with a user-defined name. In some embodiments, the control circuitry 304 maintains a table or other data structure listing keywords that are associated with particular words or phrases used in folder names. In such embodiments, the control circuitry 304 may add the keyword identified at block 706 to the list of keywords associated with the words or phrases used in the name assigned to the given folder 106 with a user-defined name.

At block 710, the control circuitry 304 adds the keyword to the plurality of keywords. For example, the control circuitry 304 may perform the process 700 repeatedly until all keywords associated with the name assigned to the given folder 106 with a user-defined name have been identified. After each iteration, the control circuitry 304 may add the keyword identified at block 706 to a list of keywords associated with the given folder 106 with a user-defined name. Such a list may subsequently be retrieved when block 402 of process 400 is performed.

FIG. 8 is a flowchart of a detailed illustrative process for identifying an application category associated with an application corresponding to a shortcut in a given folder with a user-defined name, in accordance with some embodiments of the disclosure. A process 800 for identifying an application category associated with an application corresponding to a shortcut 110 in a given folder 106 with a user-defined name may begin at block 802. At block 804, the control circuitry 304 retrieves metadata associated with the application corresponding to the shortcut 110. For example, the control circuitry 304 may retrieve the metadata associated with the application by extracting the metadata from one or more files of the application, and/or by retrieving the metadata associated with the application from an external source, such as the content source 210.

At block 806, the control circuitry 304 retrieves, from the metadata, an application category associated with the application corresponding to the shortcut 110. For example, the control circuitry 304 may extract, from the metadata, the application category associated with the application.

Figure 9:
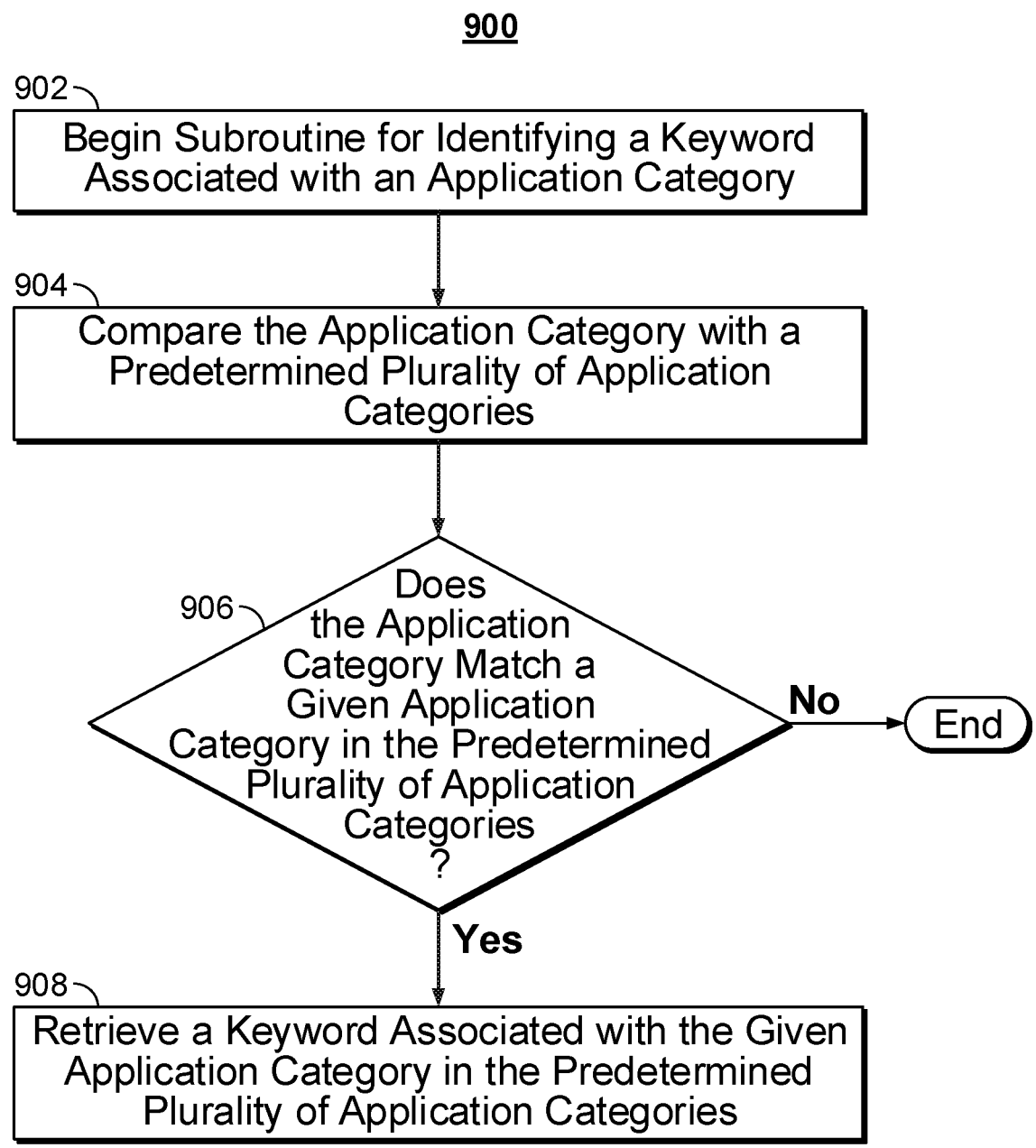
FIG. 9 is a flowchart of a detailed illustrative process for identifying a keyword associated with an application category, in accordance with some embodiments of the disclosure.

FIG. 9 is a flowchart of a detailed illustrative process for identifying a keyword associated with an application category, in accordance with some embodiments of the disclosure. A process 900 for identifying a keyword associated with an application category may begin at block 902. At block 904, the control circuitry 304 compares the application category with a predetermined plurality of application categories. For example, the control circuitry 304 may retrieve a list of application categories from an external source, such as the content source 210, and may compare the application category to application categories in the list.

At block 906, the control circuitry 304 determines whether the application category matches a given application category in the predetermined plurality of application categories. For example, the control circuitry 304 may determine, based on comparing performed at block 904, whether the application category matches any of the application categories included in the list. In response to determining that the application category matches a given application category in the list, the process 900 proceeds to block 908. In response to determining that the application category does not match any application category in the list, the process 900 ends.

At block 908, the control circuitry 304 retrieves a keyword associated with the given application category in the predetermined plurality of application categories. For example, the control circuitry 304 may retrieve, from the list, a keyword associated with the given application category.

Figure 10:
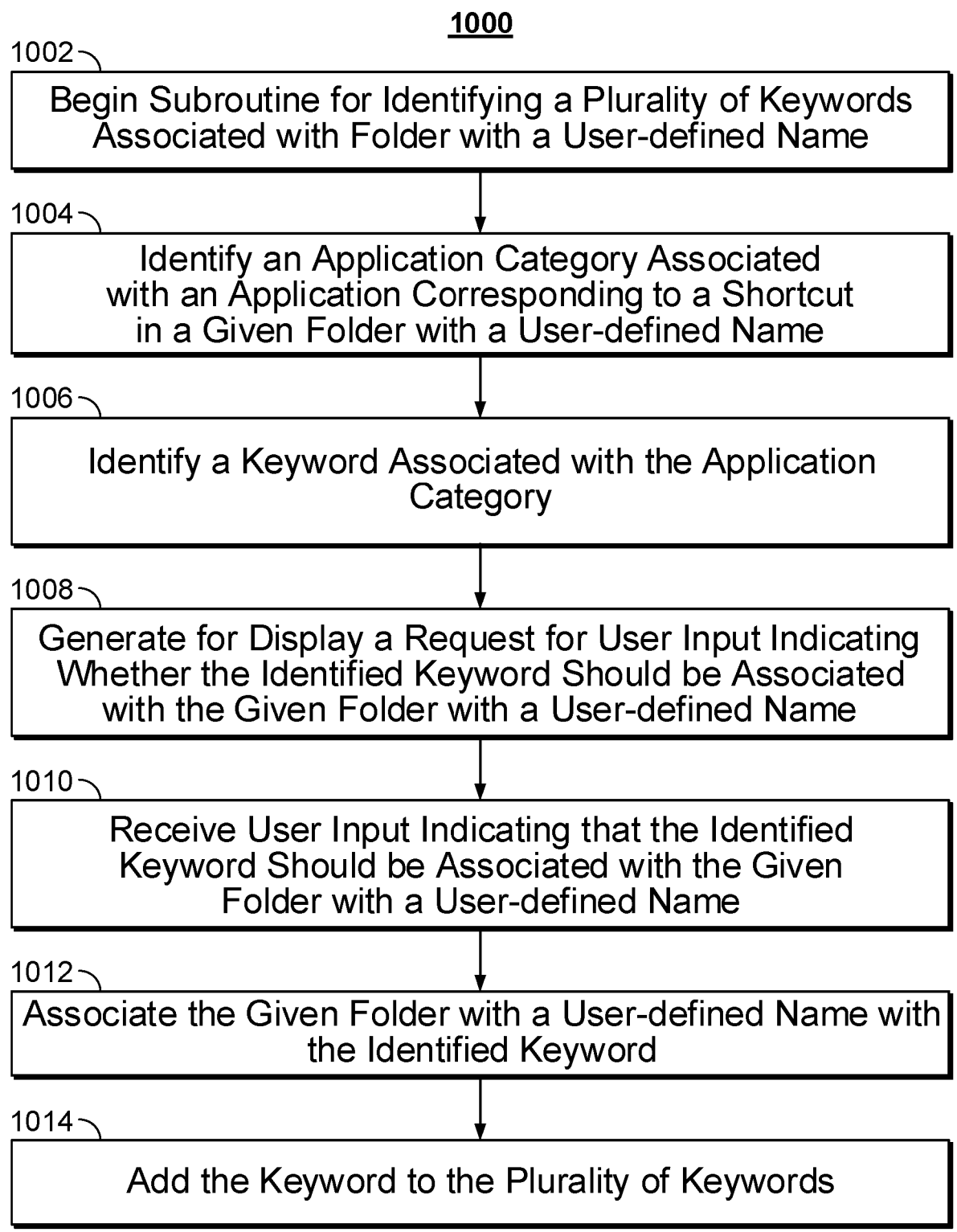
FIG. 10 is a flowchart of yet another detailed illustrative process for identifying a plurality of keywords associated with folders with user-defined names, in accordance with some embodiments of the disclosure.

FIG. 10 is a flowchart of a detailed illustrative process for identifying a plurality of keywords associated with folders with user-defined names, in accordance with some embodiments of the disclosure. A process 1000 for identifying a plurality of keywords associated with folders 106 with user-defined names may begin at block 1002. At block 1004, the control circuitry 304 identifies an application category associated with an application corresponding to a shortcut in a given folder 106 with a user-defined name. The process for identifying an application category associated with an application corresponding to a shortcut in a given folder 106 with a user-defined name is described in further detail above with reference to FIG. 8.

At block 1006, the control circuitry 304 identifies a keyword associated with the application category. The process for identifying a keyword associated with an application category is described in further detail above with reference to FIG. 9.

At block 1008, the control circuitry 304 generates for display a request for user input indicating whether the identified keyword should be associated with the given folder 106 with a user-defined name. For example, the control circuitry 304 may generate a prompt, alert, or other notification requesting user input indicating whether the retrieved keyword should be associated with the given folder 106 with a user-defined name, and cause a user interface, such as display 312, to display the generated prompt, alert, or other notification.

At block 1010, the control circuitry 304 receives user input indicating that the keyword identified at block 1006 should be associated with the given folder 106 with a user-defined name. For example, the control circuitry 304 may receive user input provided via the user input interface 310.

At block 1012, the control circuitry 304 associates the given folder 106 with a user-defined name with the keyword identified at block 1006. For example, the control circuitry 304 may generate a metadata association between the keyword and the given folder 106 with a user-defined name. In some embodiments, the control circuitry 304 maintains a table or other data structure listing keywords that are associated with particular words or phrases used in folder names. In such embodiments, the control circuitry 304 may add the keyword identified at block 1006 to the list of keywords associated with the words or phrases used in the name assigned to the given folder 106 with a user-defined name.

At block 1014, the control circuitry 304 adds the keyword to the plurality of keywords. For example, the control circuitry 304 may perform the process 1000 repeatedly until all keywords associated with the given folder 106 with a user-defined name have been identified. After each iteration, the control circuitry 304 may add the keyword identified at block 1006 to a list of keywords associated with the given folder 106 with a user-defined name. Such a list may subsequently be retrieved when block 402 of process 400 is performed.

Figure 11:
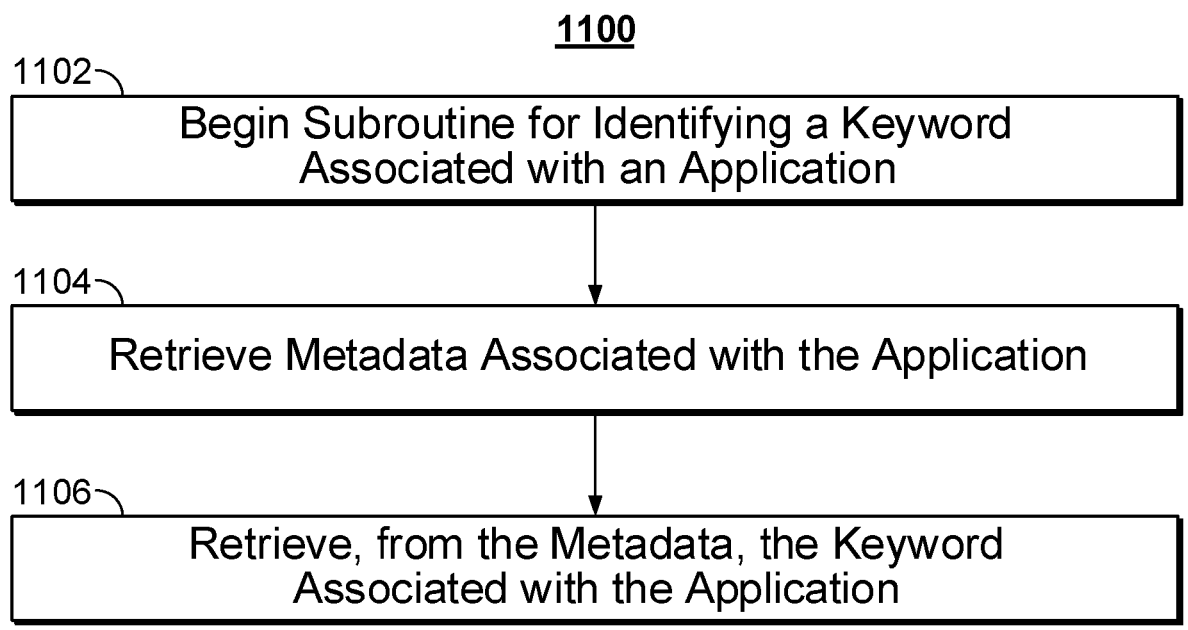
FIG. 11 is a flowchart of an illustrative process for identifying a keyword associated with an application, in accordance with some embodiments of the disclosure.

FIG. 11 is a flowchart of an illustrative process for identifying a keyword associated with an application, in accordance with some embodiments of the disclosure. A process 1100 for identifying a keyword associated with an application 104 may begin at block 1102. At block 1104, the control circuitry 304 retrieves metadata associated with the application 104. For example, the control circuitry 304 may retrieve the metadata associated with the application 104 by extracting the metadata from one or more files of the application, and/or by retrieving the metadata associated with the application 104 from an external source, such as the content source 210.

At block 1106, the control circuitry 304 retrieves, from the metadata, a keyword associated with the application 104. For example, the control circuitry 304 may extract, from the metadata, the keyword associated with the application 104.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

Items:

1. A method for automatically organizing application shortcuts into folders with user-defined names, the method comprising:
   identifying a plurality of keywords associated with folders with user-defined names on a device;
   identifying a keyword associated with an application being installed on the device;
   determining whether the keyword associated with the application matches a keyword in the plurality of keywords; and
   in response to determining that the keyword associated with the application matches a keyword in the plurality of keywords, adding a shortcut for the application to a folder with a user-defined name corresponding to the matching keyword.

2. The method of item 1, wherein identifying the plurality of keywords associated with folders with user-defined names comprises:
   retrieving a name assigned to a given folder with a user-defined name;
   identifying a keyword associated with the name assigned to the given folder with a user-defined name;
   associating the given folder with a user-defined name with the keyword; and
   adding the keyword associated with the name assigned to the given folder with a user-defined name to the plurality of keywords.

3. The method of item 2, wherein identifying the keyword associated with the name assigned to the given folder with a user-defined name comprises:
   comparing the name assigned to the given folder with a user-defined name with a predetermined plurality of folder names;
   determining that the name assigned to the given folder with a user-defined name matches a folder name in the predetermined plurality of folder names; and
   retrieving a keyword associated with the matching folder name in the predetermined plurality of folder names.

4. The method of item 2, wherein identifying the keyword associated with the name assigned to the given folder with a user-defined name comprises:
 comparing the name assigned to the given folder with a user-defined name with a predetermined plurality of folder names;
 determining whether the name assigned to the given folder with a user-defined name is a partial match to a folder name in the predetermined plurality of folder names;
 in response to determining that the name assigned to the given folder with a user-defined name is a partial match to a folder name in the predetermined plurality of folder names:
  identifying an application category associated with an application corresponding to a shortcut in the given folder with a user-defined name;
  identifying a keyword associated with the application category;
  retrieving a keyword associated with the folder name determined to be a partial match to the name assigned to the given folder with a user-defined name;
  determining whether the keyword associated with the application category matches the keyword associated with the folder name; and
  in response to determining that the keyword associated with the application category matches the keyword associated with the folder name, selecting the keyword to be associated with the given folder with a user-defined name.

5. The method of item 2, wherein identifying the keyword associated with the name assigned to the given folder with a user-defined name comprises:
 comparing the name assigned to the given folder with a user-defined name with a predetermined plurality of folder names;
 determining whether the name assigned to the given folder with a user-defined name is a partial match to a folder name in the predetermined plurality of folder names;
 in response to determining that the name assigned to the given folder with a user-defined name is a partial match to a folder name in the predetermined plurality of folder names:
  retrieving a keyword associated with the folder name determined to be a partial match to the name assigned to the given folder with a user-defined name;
  generating for display a request for user input indicating whether the retrieved keyword should be associated with the given folder with a user-defined name; and
  in response to receiving user input indicating that the retrieved keyword should be associated with the given folder with a user-defined name, selecting the keyword to be associated with the given folder with a user-defined name.

6. The method of item 1, wherein identifying the plurality of keywords associated with folders with user-defined names comprises:
 identifying an application category associated with an application corresponding to a shortcut in a given folder with a user-defined name;
 identifying a keyword associated with the application category;
 associating the given folder with a user-defined name with the keyword; and
 adding the keyword to the plurality of keywords.

7. The method of item 6, wherein identifying the application category associated with the application corresponding to the shortcut in the given folder with a user-defined name comprises:
 retrieving metadata associated with the application corresponding to the shortcut; and
 retrieving, from the metadata, an application category associated with the application corresponding to the shortcut.

8. The method of item 6, wherein identifying the keyword associated with the application category comprises:
 comparing the application category with a predetermined plurality of application categories;
 determining that the application category matches a given application category in the predetermined plurality of application categories; and
 retrieving a keyword associated with the given application category in the predetermined plurality of application categories.

9. The method of item 1, wherein identifying the plurality of keywords associated with folders with user-defined names comprises:
 identifying an application category associated with an application corresponding to a shortcut in a given folder with a user-defined name;
 identifying a keyword associated with the application category;
 generating for display a request for user input indicating whether the identified keyword should be associated with the given folder with a user-defined name;
 in response to receiving user input indicating that the identified keyword should be associated with the given folder with a user-defined name, associating the given folder with a user-defined name with the identified keyword; and
 adding the identified keyword to the plurality of keywords.

10. The method of item 1, wherein identifying a keyword associated with an application comprises:
 retrieving metadata associated with the application; and
 retrieving, from the metadata, the keyword associated with the application.

11. A system for automatically organizing application shortcuts into folders with user-defined names, the system comprising:
 control circuitry configured to:
  identify a plurality of keywords associated with folders with user-defined names on a device;
  identify a keyword associated with an application being installed on the device;
  determine whether the keyword associated with the application matches a keyword in the plurality of keywords; and
  in response to determining that the keyword associated with the application matches a keyword in the plurality of keywords, add a shortcut for the application to a folder with a user-defined name corresponding to the matching keyword.

12. The system of item 11, wherein the control circuitry is further configured to identify the plurality of keywords associated with folders with user-defined names by:
 retrieving a name assigned to a given folder with a user-defined name;

identifying a keyword associated with the name assigned to the given folder with a user-defined name;

associating the given folder with a user-defined name with the keyword; and adding the keyword associated with the name assigned to the given folder with a user-defined name to the plurality of keywords.

13. The system of item 12, wherein the control circuitry is further configured to identify the keyword associated with the name assigned to the given folder with a user-defined name by:

comparing the name assigned to the given folder with a user-defined name with a predetermined plurality of folder names;

determining that the name assigned to the given folder with a user-defined name matches a folder name in the predetermined plurality of folder names; and retrieving a keyword associated with the matching folder name in the predetermined plurality of folder names.

14. The system of item 12, wherein the control circuitry is further configured to identify the keyword associated with the name assigned to the given folder with a user-defined name by:

comparing the name assigned to the given folder with a user-defined name with a predetermined plurality of folder names;

determining whether the name assigned to the given folder with a user-defined name is a partial match to a folder name in the predetermined plurality of folder names;

in response to determining that the name assigned to the given folder with a user-defined name is a partial match to a folder name in the predetermined plurality of folder names:

identifying an application category associated with an application corresponding to a shortcut in the given folder with a user-defined name;

identifying a keyword associated with the application category;

retrieving a keyword associated with the folder name determined to be a partial match to the name assigned to the given folder with a user-defined name;

determining whether the keyword associated with the application category matches the keyword associated with the folder name; and in response to determining that the keyword associated with the application category matches the keyword associated with the folder name, selecting the keyword to be associated with the given folder with a user-defined name.

15. The system of item 12, wherein the control circuitry is further configured to identify the keyword associated with the name assigned to the given folder with a user-defined name by:

comparing the name assigned to the given folder with a user-defined name with a predetermined plurality of folder names;

determining whether the name assigned to the given folder with a user-defined name is a partial match to a folder name in the predetermined plurality of folder names;

in response to determining that the name assigned to the given folder with a user-defined name is a partial match to a folder name in the predetermined plurality of folder names:

retrieving a keyword associated with the folder name determined to be a partial match to the name assigned to the given folder with a user-defined name;

generating for display a request for user input indicating whether the retrieved keyword should be associated with the given folder with a user-defined name; and in response to receiving user input indicating that the retrieved keyword should be associated with the given folder with a user-defined name, selecting the keyword to be associated with the given folder with a user-defined name.

16. The system of item 11, wherein the control circuitry is further configured to identify the plurality of keywords associated with folders with user-defined names by:

identifying an application category associated with an application corresponding to a shortcut in a given folder with a user-defined name;

identifying a keyword associated with the application category;

associating the given folder with a user-defined name with the keyword; and adding the keyword to the plurality of keywords.

17. The system of item 16, wherein the control circuitry is further configured to identify the application category associated with the application corresponding to the shortcut in the given folder with a user-defined name by:

retrieving metadata associated with the application corresponding to the shortcut; and retrieving, from the metadata, an application category associated with the application corresponding to the shortcut.

18. The system of item 16, wherein the control circuitry is further configured to identify the keyword associated with the application category by:

comparing the application category with a predetermined plurality of application categories;

determining that the application category matches a given application category in the predetermined plurality of application categories; and retrieving a keyword associated with the given application category in the predetermined plurality of application categories.

19. The system of item 11, wherein the control circuitry is further configured to identify the plurality of keywords associated with folders with user-defined names by:

identifying an application category associated with an application corresponding to a shortcut in a given folder with a user-defined name;

identifying a keyword associated with the application category;

generating for display a request for user input indicating whether the identified keyword should be associated with the given folder with a user-defined name;

in response to receiving user input indicating that the identified keyword should be associated with the given folder with a user-defined name, associating the given folder with a user-defined name with the identified keyword; and adding the identified keyword to the plurality of keywords.

20. The system of item 11, wherein the control circuitry is further configured to identify a keyword associated with an application by:

retrieving metadata associated with the application; and retrieving, from the metadata, the keyword associated with the application.

21. An apparatus for automatically organizing application shortcuts into folders with user-defined names, the apparatus comprising:
    means for identifying a plurality of keywords associated with folders with user-defined names on a device;
    means for identifying a keyword associated with an application being installed on the device;
    means for determining whether the keyword associated with the application matches a keyword in the plurality of keywords; and
    means for, in response to determining that the keyword associated with the application matches a keyword in the plurality of keywords, adding a shortcut for the application to a folder with a user-defined name corresponding to the matching keyword.

22. The apparatus of item 21, wherein the means for identifying the plurality of keywords associated with folders with user-defined names comprise:
    means for retrieving a name assigned to a given folder with a user-defined name;
    means for identifying a keyword associated with the name assigned to the given folder with a user-defined name;
    means for associating the given folder with a user-defined name with the keyword; and
    means for adding the keyword associated with the name assigned to the given folder with a user-defined name to the plurality of keywords.

23. The apparatus of item 22, wherein the means for identifying the keyword associated with the name assigned to the given folder with a user-defined name comprise:
    means for comparing the name assigned to the given folder with a user-defined name with a predetermined plurality of folder names;
    means for determining that the name assigned to the given folder with a user-defined name matches a folder name in the predetermined plurality of folder names; and
    means for retrieving a keyword associated with the matching folder name in the predetermined plurality of folder names.

24. The apparatus of item 22, wherein the means for identifying the keyword associated with the name assigned to the given folder with a user-defined name comprise:
    means for comparing the name assigned to the given folder with a user-defined name with a predetermined plurality of folder names;
    means for determining whether the name assigned to the given folder with a user-defined name is a partial match to a folder name in the predetermined plurality of folder names;
    means for, in response to determining that the name assigned to the given folder with a user-defined name is a partial match to a folder name in the predetermined plurality of folder names:
        identifying an application category associated with an application corresponding to a shortcut in the given folder with a user-defined name;
        identifying a keyword associated with the application category;
        retrieving a keyword associated with the folder name determined to be a partial match to the name assigned to the given folder with a user-defined name;
        determining whether the keyword associated with the application category matches the keyword associated with the folder name; and
        in response to determining that the keyword associated with the application category matches the keyword associated with the folder name, selecting the keyword to be associated with the given folder with a user-defined name.

25. The apparatus of item 22, wherein the means for identifying the keyword associated with the name assigned to the given folder with a user-defined name comprise:
    means for comparing the name assigned to the given folder with a user-defined name with a predetermined plurality of folder names;
    means for determining whether the name assigned to the given folder with a user-defined name is a partial match to a folder name in the predetermined plurality of folder names;
    means for, in response to determining that the name assigned to the given folder with a user-defined name is a partial match to a folder name in the predetermined plurality of folder names:
        retrieving a keyword associated with the folder name determined to be a partial match to the name assigned to the given folder with a user-defined name;
        generating for display a request for user input indicating whether the retrieved keyword should be associated with the given folder with a user-defined name; and
        in response to receiving user input indicating that the retrieved keyword should be associated with the given folder with a user-defined name, selecting the keyword to be associated with the given folder with a user-defined name.

26. The apparatus of item 21, wherein the means for identifying the plurality of keywords associated with folders with user-defined names comprise:
    means for identifying an application category associated with an application corresponding to a shortcut in a given folder with a user-defined name;
    means for identifying a keyword associated with the application category;
    means for associating the given folder with a user-defined name with the keyword; and
    means for adding the keyword to the plurality of keywords.

27. The apparatus of item 26, wherein the means for identifying the application category associated with the application corresponding to the shortcut in the given folder with a user-defined name comprise:
    means for retrieving metadata associated with the application corresponding to the shortcut; and
    means for retrieving, from the metadata, an application category associated with the application corresponding to the shortcut.

28. The apparatus of item 26, wherein the means for identifying the keyword associated with the application category comprise:
    means for comparing the application category with a predetermined plurality of application categories;
    means for determining that the application category matches a given application category in the predetermined plurality of application categories; and
    means for retrieving a keyword associated with the given application category in the predetermined plurality of application categories.

29. The apparatus of item 21, wherein the means for identifying the plurality of keywords associated with folders with user-defined names comprise:

means for identifying an application category associated with an application corresponding to a shortcut in a given folder with a user-defined name;
means for identifying a keyword associated with the application category;
means for generating for display a request for user input indicating whether the identified keyword should be associated with the given folder with a user-defined name;
means for, in response to receiving user input indicating that the identified keyword should be associated with the given folder with a user-defined name, associating the given folder with a user-defined name with the identified keyword; and
means for adding the identified keyword to the plurality of keywords.

30. The apparatus of item 21, wherein the means for identifying a keyword associated with an application comprise:
means for retrieving metadata associated with the application; and
means for retrieving, from the metadata, the keyword associated with the application.

31. A non-transitory computer-readable medium having instructions encoded thereon that, when executed by control circuitry, cause the control circuitry to:
identify a plurality of keywords associated with folders with user-defined names on a device;
identify a keyword associated with an application being installed on the device;
determine whether the keyword associated with the application matches a keyword in the plurality of keywords; and
in response to determining that the keyword associated with the application matches a keyword in the plurality of keywords, add a shortcut for the application to a folder with a user-defined name corresponding to the matching keyword.

32. The non-transitory computer-readable medium of item 31, wherein the instructions for identifying the plurality of keywords associated with folders with user-defined names comprise instructions that, when executed by the control circuitry, cause the control circuitry to:
retrieve a name assigned to a given folder with a user-defined name;
identify a keyword associated with the name assigned to the given folder with a user-defined name;
associate the given folder with a user-defined name with the keyword; and
add the keyword associated with the name assigned to the given folder with a user-defined name to the plurality of keywords.

33. The non-transitory computer-readable medium of item 32, wherein the instructions for identifying the keyword associated with the name assigned to the given folder with a user-defined name comprise instructions that, when executed by the control circuitry, cause the control circuitry to:
compare the name assigned to the given folder with a user-defined name with a predetermined plurality of folder names;
determine that the name assigned to the given folder with a user-defined name matches a folder name in the predetermined plurality of folder names; and
retrieve a keyword associated with the matching folder name in the predetermined plurality of folder names.

34. The non-transitory computer-readable medium of item 32, wherein the instructions for identifying the keyword associated with the name assigned to the given folder with a user-defined name comprise instructions that, when executed by the control circuitry, cause the control circuitry to:
compare the name assigned to the given folder with a user-defined name with a predetermined plurality of folder names;
determine whether the name assigned to the given folder with a user-defined name is a partial match to a folder name in the predetermined plurality of folder names;
in response to determining that the name assigned to the given folder with a user-defined name is a partial match to a folder name in the predetermined plurality of folder names:
identify an application category associated with an application corresponding to a shortcut in the given folder with a user-defined name;
identify a keyword associated with the application category;
retrieve a keyword associated with the folder name determined to be a partial match to the name assigned to the given folder with a user-defined name;
determine whether the keyword associated with the application category matches the keyword associated with the folder name; and
in response to determining that the keyword associated with the application category matches the keyword associated with the folder name, select the keyword to be associated with the given folder with a user-defined name.

35. The non-transitory computer-readable medium of item 32, wherein the instructions for identifying the keyword associated with the name assigned to the given folder with a user-defined name comprise instructions that, when executed by the control circuitry, cause the control circuitry to:
compare the name assigned to the given folder with a user-defined name with a predetermined plurality of folder names;
determine whether the name assigned to the given folder with a user-defined name is a partial match to a folder name in the predetermined plurality of folder names;
in response to determining that the name assigned to the given folder with a user-defined name is a partial match to a folder name in the predetermined plurality of folder names:
retrieve a keyword associated with the folder name determined to be a partial match to the name assigned to the given folder with a user-defined name;
generate for display a request for user input indicating whether the retrieved keyword should be associated with the given folder with a user-defined name; and
in response to receiving user input indicating that the retrieved keyword should be associated with the given folder with a user-defined name, select the keyword to be associated with the given folder with a user-defined name.

36. The non-transitory computer-readable medium of item 31, wherein the instructions for identifying the plurality of keywords associated with folders with user-defined names comprise instructions that, when executed by the control circuitry, cause the control circuitry to:

identify an application category associated with an application corresponding to a shortcut in a given folder with a user-defined name;
identify a keyword associated with the application category;
associate the given folder with a user-defined name with the keyword; and
add the keyword to the plurality of keywords.

37. The non-transitory computer-readable medium of item 36, wherein the instructions for identifying the application category associated with the application corresponding to the shortcut in the given folder with a user-defined name comprise instructions that, when executed by the control circuitry, cause the control circuitry to:
   retrieve metadata associated with the application corresponding to the shortcut; and
   retrieve, from the metadata, an application category associated with the application corresponding to the shortcut.

38. The non-transitory computer-readable medium of item 36, wherein the instructions for identifying the keyword associated with the application category comprise instructions that, when executed by the control circuitry, cause the control circuitry to:
   compare the application category with a predetermined plurality of application categories;
   determine that the application category matches a given application category in the predetermined plurality of application categories; and
   retrieve a keyword associated with the given application category in the predetermined plurality of application categories.

39. The non-transitory computer-readable medium of item 31, wherein the instructions for identifying the plurality of keywords associated with folders with user-defined names comprise instructions that, when executed by the control circuitry, cause the control circuitry to:
   identify an application category associated with an application corresponding to a shortcut in a given folder with a user-defined name;
   identify a keyword associated with the application category;
   generate for display a request for user input indicating whether the identified keyword should be associated with the given folder with a user-defined name;
   in response to receiving user input indicating that the identified keyword should be associated with the given folder with a user-defined name, associate the given folder with a user-defined name with the identified keyword; and
   add the identified keyword to the plurality of keywords.

40. The non-transitory computer-readable medium of item 31, wherein the instructions for identifying a keyword associated with an application comprise instructions that, when executed by the control circuitry, cause the control circuitry to:
   retrieve metadata associated with the application; and
   retrieve, from the metadata, the keyword associated with the application.

41. A method for automatically organizing application shortcuts into folders with user-defined names, the method comprising:
   identifying, using control circuitry, a plurality of keywords associated with folders with user-defined names on a device;
   identifying a keyword associated with an application being installed on the device;
   determining whether the keyword associated with the application matches a keyword in the plurality of keywords; and
   in response to determining that the keyword associated with the application matches a keyword in the plurality of keywords, adding a shortcut for the application to a folder with a user-defined name corresponding to the matching keyword.

42. The method of item 41, wherein identifying the plurality of keywords associated with folders with user-defined names comprises:
   retrieving a name assigned to a given folder with a user-defined name;
   identifying a keyword associated with the name assigned to the given folder with a user-defined name;
   associating the given folder with a user-defined name with the keyword; and
   adding the keyword associated with the name assigned to the given folder with a user-defined name to the plurality of keywords.

43. The method of any of items 41-42, wherein identifying the keyword associated with the name assigned to the given folder with a user-defined name comprises:
   comparing the name assigned to the given folder with a user-defined name with a predetermined plurality of folder names;
   determining that the name assigned to the given folder with a user-defined name matches a folder name in the predetermined plurality of folder names; and
   retrieving a keyword associated with the matching folder name in the predetermined plurality of folder names.

44. The method of any of items 41-43, wherein identifying the keyword associated with the name assigned to the given folder with a user-defined name comprises:
   comparing the name assigned to the given folder with a user-defined name with a predetermined plurality of folder names;
   determining whether the name assigned to the given folder with a user-defined name is a partial match to a folder name in the predetermined plurality of folder names;
   in response to determining that the name assigned to the given folder with a user-defined name is a partial match to a folder name in the predetermined plurality of folder names:
      identifying an application category associated with an application corresponding to a shortcut in the given folder with a user-defined name;
      identifying a keyword associated with the application category;
      retrieving a keyword associated with the folder name determined to be a partial match to the name assigned to the given folder with a user-defined name;
      determining whether the keyword associated with the application category matches the keyword associated with the folder name; and
      in response to determining that the keyword associated with the application category matches the keyword associated with the folder name, selecting the keyword to be associated with the given folder with a user-defined name.

45. The method of any of items 41-44, wherein identifying the keyword associated with the name assigned to the given folder with a user-defined name comprises:

comparing the name assigned to the given folder with a user-defined name with a predetermined plurality of folder names;
determining whether the name assigned to the given folder with a user-defined name is a partial match to a folder name in the predetermined plurality of folder names;
in response to determining that the name assigned to the given folder with a user-defined name is a partial match to a folder name in the predetermined plurality of folder names:
retrieving a keyword associated with the folder name determined to be a partial match to the name assigned to the given folder with a user-defined name;
generating for display a request for user input indicating whether the retrieved keyword should be associated with the given folder with a user-defined name; and
in response to receiving user input indicating that the retrieved keyword should be associated with the given folder with a user-defined name, selecting the keyword to be associated with the given folder with a user-defined name.

46. The method of any of items 41-45, wherein identifying the plurality of keywords associated with folders with user-defined names comprises:
identifying an application category associated with an application corresponding to a shortcut in a given folder with a user-defined name;
identifying a keyword associated with the application category;
associating the given folder with a user-defined name with the keyword; and
adding the keyword to the plurality of keywords.

47. The method of any of items 41-46, wherein identifying the application category associated with the application corresponding to the shortcut in the given folder with a user-defined name comprises:
retrieving metadata associated with the application corresponding to the shortcut; and
retrieving, from the metadata, an application category associated with the application corresponding to the shortcut.

48. The method of any of items 41-47, wherein identifying the keyword associated with the application category comprises:
comparing the application category with a predetermined plurality of application categories;
determining that the application category matches a given application category in the predetermined plurality of application categories; and
retrieving a keyword associated with the given application category in the predetermined plurality of application categories.

49. The method of any of items 41-48, wherein identifying the plurality of keywords associated with folders with user-defined names comprises:
identifying an application category associated with an application corresponding to a shortcut in a given folder with a user-defined name;
identifying a keyword associated with the application category;
generating for display a request for user input indicating whether the identified keyword should be associated with the given folder with a user-defined name;
in response to receiving user input indicating that the identified keyword should be associated with the given folder with a user-defined name, associating the given folder with a user-defined name with the identified keyword; and
adding the identified keyword to the plurality of keywords.

50. The method of any of items 41-49, wherein identifying a keyword associated with an application comprises:
retrieving metadata associated with the application; and
retrieving, from the metadata, the keyword associated with the application.

What is claimed is:
1. A method for automatically organizing application shortcuts into folders with user-defined names, the method comprising:
identifying a plurality of keywords associated with a plurality of folders with user-defined names on a device;
after identifying an application to be installed, automatically perform, by control circuitry:
identifying a keyword associated with the application being installed on the device; and
determining whether the keyword associated with the application matches a keyword in the plurality of keywords associated with the plurality of folders with user-defined names by comparing the keyword to at least a first keyword associated with a first folder of the plurality of folders and a second keyword associated with a second folder of the plurality of folders; and
in response to determining that the keyword associated with the application matches a keyword in the plurality of keywords, adding a shortcut for the application to a folder with a user-defined name corresponding to the matching keyword.

2. The method of claim 1, wherein identifying the plurality of keywords associated with the plurality of folders with user-defined names comprises:
retrieving a name assigned to a given folder with a user-defined name;
identifying a keyword associated with the name assigned to the given folder with a user-defined name;
associating the given folder with a user-defined name with the keyword; and
adding the keyword associated with the name assigned to the given folder with a user-defined name to the plurality of keywords.

3. The method of claim 2, wherein identifying the keyword associated with the name assigned to the given folder with a user-defined name comprises:
comparing the name assigned to the given folder with a user-defined name with a predetermined plurality of folder names;
determining that the name assigned to the given folder with a user-defined name matches a folder name in the predetermined plurality of folder names; and
retrieving a keyword associated with the matching folder name in the predetermined plurality of folder names.

4. The method of claim 2, wherein identifying the keyword associated with the name assigned to the given folder with a user-defined name comprises:
comparing the name assigned to the given folder with a user-defined name with a predetermined plurality of folder names;

determining whether the name assigned to the given folder with a user-defined name is a partial match to a folder name in the predetermined plurality of folder names;

in response to determining that the name assigned to the given folder with a user-defined name is a partial match to a folder name in the predetermined plurality of folder names:

identifying an application category associated with an application corresponding to a shortcut in the given folder with a user-defined name;

identifying a keyword associated with the application category;

retrieving a keyword associated with the folder name determined to be a partial match to the name assigned to the given folder with a user-defined name;

determining whether the keyword associated with the application category matches the keyword associated with the folder name; and in response to determining that the keyword associated with the application category matches the keyword associated with the folder name, selecting the keyword to be associated with the given folder with a user-defined name.

5. The method of claim 2, wherein identifying the keyword associated with the name assigned to the given folder with a user-defined name comprises:

comparing the name assigned to the given folder with a user-defined name with a predetermined plurality of folder names;

determining whether the name assigned to the given folder with a user-defined name is a partial match to a folder name in the predetermined plurality of folder names;

in response to determining that the name assigned to the given folder with a user-defined name is a partial match to a folder name in the predetermined plurality of folder names:

retrieving a keyword associated with the folder name determined to be a partial match to the name assigned to the given folder with a user-defined name;

generating for display a request for user input indicating whether the retrieved keyword is to be associated with the given folder with a user-defined name; and in response to receiving user input indicating that the retrieved keyword is to be associated with the given folder with a user-defined name, selecting the keyword to be associated with the given folder with a user-defined name.

6. The method of claim 1, wherein identifying the plurality of keywords associated with the plurality of folders with user-defined names comprises:

identifying an application category associated with an application corresponding to a shortcut in a given folder with a user-defined name;

identifying a keyword associated with the application category;

associating the given folder with a user-defined name with the keyword; and adding the keyword to the plurality of keywords.

7. The method of claim 6, wherein identifying the keyword associated with the application category comprises:

comparing the application category with a predetermined plurality of application categories;

determining that the application category matches a given application category in the predetermined plurality of application categories; and retrieving a keyword associated with the given application category in the predetermined plurality of application categories.

8. A system for automatically organizing application shortcuts into folders with user-defined names, the system comprising:

control circuitry configured to:

identify a plurality of keywords associated with a plurality of folders with user-defined names on a device;

after identifying an application to be installed, automatically performing:

identify a keyword associated with the application being installed on the device; and determine whether the keyword associated with the application matches a keyword in the plurality of keywords associated with the plurality of folders with user-defined names by comparing the keyword to at least a first keyword associated with a first folder of the plurality of folders and a second keyword associated with a second folder of the plurality of folders; and in response to determining that the keyword associated with the application matches a keyword in the plurality of keywords, add a shortcut for the application to a folder with a user-defined name corresponding to the matching keyword.

9. The system of claim 8, wherein the control circuitry is further configured to identify the plurality of keywords associated with the plurality of folders with user-defined names by:

retrieving a name assigned to a given folder with a user-defined name;

identifying a keyword associated with the name assigned to the given folder with a user-defined name;

associating the given folder with a user-defined name with the keyword; and adding the keyword associated with the name assigned to the given folder with a user-defined name to the plurality of keywords.

10. The system of claim 9, wherein the control circuitry is further configured to identify the keyword associated with the name assigned to the given folder with a user-defined name by:

comparing the name assigned to the given folder with a user-defined name with a predetermined plurality of folder names;

determining that the name assigned to the given folder with a user-defined name matches a folder name in the predetermined plurality of folder names; and retrieving a keyword associated with the matching folder name in the predetermined plurality of folder names.

11. The system of claim 9, wherein the control circuitry is further configured to identify the keyword associated with the name assigned to the given folder with a user-defined name by:

comparing the name assigned to the given folder with a user-defined name with a predetermined plurality of folder names;

determining whether the name assigned to the given folder with a user-defined name is a partial match to a folder name in the predetermined plurality of folder names;

in response to determining that the name assigned to the given folder with a user-defined name is a partial match to a folder name in the predetermined plurality of folder names:
　　identifying an application category associated with an application corresponding to a shortcut in the given folder with a user-defined name;
　　identifying a keyword associated with the application category;
retrieving a keyword associated with the folder name determined to be a partial match to the name assigned to the given folder with a user-defined name;
　　determining whether the keyword associated with the application category matches the keyword associated with the folder name; and
　　in response to determining that the keyword associated with the application category matches the keyword associated with the folder name, selecting the keyword to be associated with the given folder with a user-defined name.

12. The system of claim 9, wherein the control circuitry is further configured to identify the keyword associated with the name assigned to the given folder with a user-defined name by:
　　comparing the name assigned to the given folder with a user-defined name with a predetermined plurality of folder names;
　　determining whether the name assigned to the given folder with a user-defined name is a partial match to a folder name in the predetermined plurality of folder names;
　　in response to determining that the name assigned to the given folder with a user-defined name is a partial match to a folder name in the predetermined plurality of folder names:
　　　　retrieving a keyword associated with the folder name determined to be a partial match to the name assigned to the given folder with a user-defined name;
　　　　generating for display a request for user input indicating whether the retrieved keyword is to be associated with the given folder with a user-defined name; and
　　　　in response to receiving user input indicating that the retrieved keyword is to be associated with the given folder with a user-defined name, selecting the keyword to be associated with the given folder with a user-defined name.

13. The system of claim 8, wherein the control circuitry is further configured to identify the plurality of keywords associated with the plurality of folders with user-defined names by:
　　identifying an application category associated with an application corresponding to a shortcut in a given folder with a user-defined name;
　　identifying a keyword associated with the application category;
　　associating the given folder with a user-defined name with the keyword; and
　　adding the keyword to the plurality of keywords.

14. The system of claim 13, wherein the control circuitry is further configured to identify the keyword associated with the application category by:
　　comparing the application category with a predetermined plurality of application categories;
　　determining that the application category matches a given application category in the predetermined plurality of application categories; and
　　retrieving a keyword associated with the given application category in the predetermined plurality of application categories.

15. The method of claim 6, wherein identifying the application category associated with the application corresponding to the shortcut in the given folder with a user-defined name comprises:
　　retrieving metadata associated with the application corresponding to the shortcut; and
　　retrieving, from the metadata, an application category associated with the application corresponding to the shortcut.

16. The method of claim 1, wherein identifying the plurality of keywords associated with the plurality of folders with user-defined names comprises:
　　identifying an application category associated with an application corresponding to a shortcut in a given folder with a user-defined name;
　　identifying a keyword associated with the application category;
　　generating for display a request for user input indicating whether the identified keyword is to be associated with the given folder with a user-defined name;
　　in response to receiving user input indicating that the identified keyword is to be associated with the given folder with a user-defined name, associating the given folder with a user-defined name with the identified keyword; and
　　adding the identified keyword to the plurality of keywords.

17. The method of claim 1, wherein identifying a keyword associated with an application comprises:
　　retrieving metadata associated with the application; and
　　retrieving, from the metadata, the keyword associated with the application.

18. The system of claim 13, wherein the control circuitry is further configured to identify the application category associated with the application corresponding to the shortcut in the given folder with a user-defined name by:
　　retrieving metadata associated with the application corresponding to the shortcut; and
　　retrieving, from the metadata, an application category associated with the application corresponding to the shortcut.

19. The system of claim 8, wherein the control circuitry is further configured to identify the plurality of keywords associated with the plurality of folders with user-defined names by:
　　identifying an application category associated with an application corresponding to a shortcut in a given folder with a user-defined name;
　　identifying a keyword associated with the application category;
　　generating for display a request for user input indicating whether the identified keyword is to be associated with the given folder with a user-defined name;
　　in response to receiving user input indicating that the identified keyword is to be associated with the given folder with a user-defined name, associating the given folder with a user-defined name with the identified keyword; and
　　adding the identified keyword to the plurality of keywords.

20. The system of claim 8, wherein the control circuitry is further configured to identify
a keyword associated with an application by:
　　retrieving metadata associated with the application; and retrieving, from the metadata, the keyword associated with the application.

\* \* \* \* \*